US011908392B2

(12) United States Patent
Jeong et al.

(10) Patent No.: US 11,908,392 B2
(45) Date of Patent: Feb. 20, 2024

(54) DISPLAY DEVICE

(71) Applicant: Samsung Display Co., LTD., Yongin-si (KR)

(72) Inventors: Jun Ki Jeong, Yongin-si (KR); Hyun Joon Kim, Hwaseong-si (KR); Jung Hwan Hwang, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/072,507

(22) Filed: Nov. 30, 2022

(65) Prior Publication Data

US 2023/0186836 A1 Jun. 15, 2023

(30) Foreign Application Priority Data

Dec. 14, 2021 (KR) ........................ 10-2021-0178475

(51) Int. Cl.
*G09G 3/32* (2016.01)

(52) U.S. Cl.
CPC ....... *G09G 3/32* (2013.01); *G09G 2300/0852* (2013.01); *G09G 2320/0233* (2013.01)

(58) Field of Classification Search
CPC ............ G09G 3/32; G09G 2300/0852; G09G 2320/0233; G09G 3/3233; G09G 3/3258; G09G 2300/0819; G09G 2300/0861; G09G 2320/0242; G09G 3/2081; G09G 2310/0259; G09G 2310/066; G09G 3/3225; G09G 3/3266; G09G 3/3275; G09G 2310/0202; G09G 2320/0271
See application file for complete search history.

(56) References Cited

U.S. PATENT DOCUMENTS

2006/0208979 A1* 9/2006 Fish ..................... G09G 3/3258 345/81
2013/0082906 A1* 4/2013 Toyomura ............ G09G 3/3233 345/55
2013/0083000 A1* 4/2013 Toyomura ............ G09G 3/3233 345/212

(Continued)

FOREIGN PATENT DOCUMENTS

CN 113096589 A 7/2021
CN 113674678 A 11/2021
KR 2021-0087867 A 7/2021

*Primary Examiner* — Andrew Sasinowski
(74) *Attorney, Agent, or Firm* — Lewis Roca Rothgerber Christie LLP

(57) ABSTRACT

A display device including: a first transistor configured to control a control current based on a voltage of a first node; a second transistor configured to electrically connect a second node that is a first electrode of the first transistor to a first data line in response to a scan write signal; a third transistor configured to control a driving current based on a voltage of a third node; a fourth transistor configured to electrically connect a fourth node that is a first electrode of the third transistor to a second data line in response to the scan write signal; a fifth transistor configured to control the driving current based on a voltage of a fifth node having received the control current; and a light emitting element configured to receive the driving current, wherein the fifth transistor is of a different type from that of the first to fourth transistors.

20 Claims, 22 Drawing Sheets

(56) References Cited

U.S. PATENT DOCUMENTS

| | | | | |
|---|---|---|---|---|
| 2015/0154899 | A1* | 6/2015 | Chang | G09G 3/3648 345/55 |
| 2018/0301080 | A1* | 10/2018 | Shigeta | G09G 3/32 |
| 2020/0394953 | A1 | 12/2020 | Kim et al. | |
| 2021/0210002 | A1 | 7/2021 | Kim et al. | |
| 2021/0241682 | A1 | 8/2021 | Jung et al. | |
| 2022/0114951 | A1 | 4/2022 | Chang et al. | |

* cited by examiner

DISPLAY DEVICE

CROSS-REFERENCE TO RELATED APPLICATION

The present application claims priority to and the benefit of Korean Patent Application No. 10-2021-0178475 filed on Dec. 14, 2021, in the Korean Intellectual Property Office, the entire content of which is incorporated herein by reference.

BACKGROUND

1. Field

Aspects of some embodiments of the present disclosure relate to a display device.

2. Description of the Related Art

With the advance of information-oriented society, more and more demands are placed on display devices for displaying images in various ways. Display devices may be flat panel display devices such as liquid crystal display devices, field emission display devices, and organic light emitting display devices.

Light emitting display devices may include an organic light emitting display device including an organic light emitting diode, and an inorganic light emitting display device including an inorganic light emitting diode. In an organic light emitting display device, the luminance or grayscale of light of the organic light emitting diode may be adjusted by adjusting the magnitude of the driving current applied to the organic light emitting diode. Because the wavelength of light emitted from the inorganic light emitting diode varies depending on the driving current, an image quality may deteriorate when the inorganic light emitting diode is driven in the same manner as the organic light emitting diode.

The above information disclosed in this Background section is only for enhancement of understanding of the background and therefore the information discussed in this Background section does not necessarily constitute prior art.

SUMMARY

Aspects of some embodiments of the present disclosure include a display device capable of increasing a constant current driving region in a low grayscale region and also capable of improving expression of low gray levels.

However, embodiments of the present disclosure are not restricted to the one set forth herein. The above and other aspects of embodiments according to the present disclosure will become more apparent to one of ordinary skill in the art to which the present disclosure pertains by referencing the detailed description of the present disclosure given below.

According to some embodiments of the present disclosure, a display device comprises a first transistor configured to control a control current based on a voltage of a first node, a second transistor configured to electrically connect a second node that is a first electrode of the first transistor to a first data line based on a scan write signal, a third transistor configured to control a driving current based on a voltage of a third node, a fourth transistor configured to electrically connect a fourth node that is a first electrode of the third transistor to a second data line based on the scan write signal, a fifth transistor configured to control the driving current based on a voltage of a fifth node having received the control current, and a light emitting element configured to receive the driving current and emit light. The fifth transistor is implemented as a MOSFET of a different type from that of the first to fourth transistors.

According to some embodiments, the fifth transistor may comprise an oxide-based semiconductor layer, and the first to fourth transistors may comprise a low-temperature polysilicon-based semiconductor layer.

According to some embodiments, an S-factor of the fifth transistor may be smaller than an S-factor of the first to fourth transistors.

According to some embodiments, the display device may further comprise a sweep line configured to supply a sweep signal having a pulse that linearly decreases from a gate-off voltage to a gate-on voltage, and a first capacitor comprising a first capacitor electrode connected to the first node, and a second capacitor electrode connected to the sweep line.

According to some embodiments, the display device may further comprise a sixth transistor configured to electrically connect the first node to an initialization voltage line based on a scan initialization signal, and a seventh transistor configured to electrically connect a sixth node that is a second electrode of the first transistor to the first node based on the scan write signal.

According to some embodiments, the display device may further comprise an eighth transistor configured to electrically connect the first power line to the second node based on a PWM emission signal received from a PWM emission line, and a ninth transistor configured to electrically connect the sixth node to the fifth node based on the PWM emission signal.

According to some embodiments, the display device may further comprise a tenth transistor configured to electrically connect a gate-off voltage line to a second capacitor electrode of the first capacitor based on a scan control signal.

According to some embodiments, the display device may further comprise a second capacitor comprising a first capacitor electrode connected to the third node and a second capacitor electrode connected to a seventh node, an eleventh transistor configured to electrically connect a first power line to the seventh node based on a scan control signal, and a twelfth transistor configured to electrically connect a second power line to the seventh node based on a PWM emission signal.

According to some embodiments, the display device may further comprise a thirteenth transistor configured to electrically connect the third node to an initialization voltage line based on a scan initialization signal, and a fourteenth transistor configured to electrically connect an eighth node that is a second electrode of the third transistor to the third node based on the scan write signal.

According to some embodiments, the display device may further comprise a fifteenth transistor configured to electrically connect a second power line to the fourth node based on the PWM emission signal, and a sixteenth transistor configured to electrically connect a second electrode of the fifth transistor to a first electrode of the light emitting element based on a PWM emission signal.

According to some embodiments, the display device may further comprise a third capacitor comprising a first capacitor electrode connected to the fifth node and a second capacitor electrode connected to an initialization voltage line, and a seventeenth transistor configured to electrically connect the fifth node to the initialization voltage line based on a scan initialization signal.

According to some embodiments, the display device may further comprise an eighteenth transistor configured to electrically connect a first electrode of the light emitting element to the initialization voltage line based on a scan control signal.

According to some embodiments of the present disclosure, a display device comprises a first transistor configured to control a control current based on a voltage of a first node, a second transistor configured to electrically connect a second node that is a first electrode of the first transistor to a first data line based on a scan write signal, a third transistor configured to control a driving current based on a voltage of a third node, a fourth transistor configured to electrically connect a fourth node that is a first electrode of the third transistor to a second data line based on the scan write signal, a fifth transistor configured to control the driving current based on a voltage of a fifth node having received the control current, and a light emitting element configured to receive the driving current and emit light. The fifth transistor is turned on in case that a gate-source voltage is greater than a threshold voltage, and the first to fourth transistors are turned on in case that a source-gate voltage is greater than the threshold voltage.

According to some embodiments, the fifth transistor may comprise an oxide-based semiconductor layer, and the first to fourth transistors may comprise a low-temperature polysilicon-based semiconductor layer.

According to some embodiments, the display device may further comprise a sweep line configured to supply a sweep signal having a pulse that linearly decreases from a gate-off voltage to a gate-on voltage, and a first capacitor comprising a first capacitor electrode connected to a gate electrode of the first transistor, and a second capacitor electrode connected to the sweep line.

According to some embodiments, the display device may further comprise a sixth transistor configured to electrically connect the first node to an initialization voltage line based on a scan initialization signal, a seventh transistor configured to electrically connect a sixth node that is a second electrode of the first transistor to the first node based on the scan write signal, and an eighth transistor configured to electrically connect a gate-off voltage line to the second capacitor electrode of the first capacitor based on a scan control signal.

According to some embodiments, the scan initialization signal and the scan write signal may be generated at intervals of one frame period, and the scan control signal may be generated as many as the number of emission periods during the one frame period.

According to some embodiments of the present disclosure, a display device comprises a first transistor configured to control a control current based on a voltage of a first node, a first capacitor comprising a first capacitor electrode connected to the first node, and a second capacitor electrode connected to a sweep line, a second transistor configured to control a driving current based on a voltage of a second node, a second capacitor comprising a first capacitor electrode connected to the second node and a second capacitor electrode connected to a third node, a third transistor configured to control the driving current based on a voltage of a fourth node having received the control current, a third capacitor comprising a first capacitor electrode connected to the fourth node and a second capacitor electrode connected to an initialization voltage line, and a light emitting element configured to receive the driving current and emit light. The third transistor is implemented as a MOSFET of a different type from that of the first and second transistors.

According to some embodiments, the display device may further comprise a fourth transistor configured to electrically connect a fifth node that is a first electrode of the first transistor to a first data line, and a fifth transistor configured to electrically connect a sixth node that is a first electrode of the second transistor to a second data line.

According to some embodiments, the display device may further comprise a sixth transistor configured to electrically connect the first node to the initialization voltage line based on a scan initialization signal, and a seventh transistor configured to electrically connect a seventh node that is a second electrode of the first transistor to the first node based on the scan write signal.

A display device according to some embodiments includes a first transistor configured to control a control current, a second transistor configured to control a driving current, and a third transistor configured to receive the control current to control the driving current. As the third transistor is implemented as a MOSFET of a different type from the first and second transistors, a constant current driving region in a low grayscale region may be increased, and expression of low gray levels may be improved.

However, the characteristics of embodiments of the present disclosure are not limited to the aforementioned characteristics, and various other characteristics are included in the present specification.

BRIEF DESCRIPTION OF THE DRAWINGS

The above and other aspects and features of the present disclosure will become more apparent by describing in more detail aspects of some embodiments thereof with reference to the attached drawings, in which.

DETAILED DESCRIPTION

Figure 1:
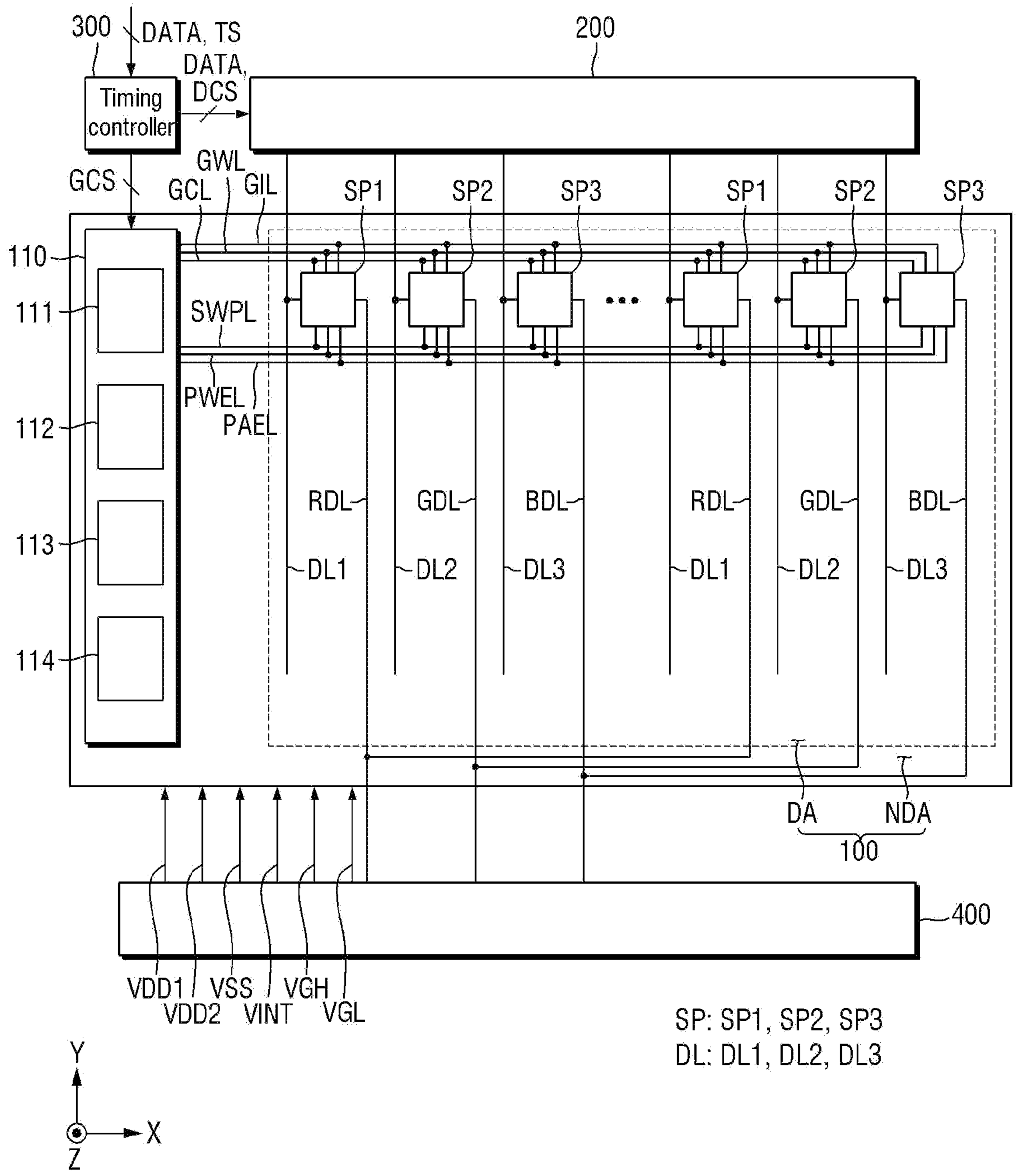
FIG. 1 is a block diagram illustrating a display device according to some embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation, not as terms of degree, and thus are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or overly formal sense, unless clearly so defined herein.

Hereinafter, further details of some embodiments of the present disclosure will be described with reference to the accompanying drawings.

FIG. 1 is a block diagram illustrating a display device according to some embodiments.

Referring to FIG. 1, the display device may include a display panel 100, a gate driver 110, a data driver 200, a timing controller 300, and a power supply unit 400.

A display area DA of the display panel 100 may include pixels SP for displaying an image, and a scan initialization line GIL, a scan write line GWL, a scan control line GCL, a sweep line SWPL, a PWM emission line PWEL, a PAM emission line PAEL, a data line DL, a first PAM data line RDL, a second PAM data line GDL, and a third PAM data line BDL that are connected to the pixels SP.

The scan initialization line GIL, the scan write line GWL, the scan control line GCL, the sweep line SWPL, the PWM emission line PWEL, and the PAM light emission line PAEL may extend in the first direction (X-axis direction), and may be spaced apart from each other in the second direction (Y-axis direction) crossing the first direction (X-axis direction). The data line DL, the first PAM data line RDL, the second PAM data line GDL, and the third PAM data line BDL may extend in the second direction (Y-axis direction), and may be spaced apart from each other in the first direction (X-axis direction). The first PAM data lines RDL may be electrically connected to each other, the second PAM data lines GDL may be electrically connected to each other, and the third PAM data lines BDL may be electrically connected to each other.

The pixels SP may include first pixels SP1 that emit first light (e.g., a first color of light), second pixels SP2 that emit second light (e.g., a second color of light), and third pixels SP3 that emit third light (e.g., a third color of light). The first light may correspond to light in a red wavelength band, the second light may correspond to light in a green wavelength band, and the third light may correspond to light in a blue wavelength band, but embodiments according to the present disclosure are not limited thereto. For example, the peak wavelength of the first light may be equivalent to about 600 nm to about 750 nm, the peak wavelength of the second light may be equivalent to about 480 nm to about 560 nm, and the peak wavelength of the third light may be equivalent to about 370 nm to about 460 nm.

Each of the first to third pixels SP1, SP2, and SP3 may include a light emitting element to emit light. The light emitting element may be an inorganic light emitting element including a first electrode, a second electrode, and an inorganic semiconductor located between the first electrode and the second electrode. For example, the light emitting element may be a micro light emitting diode including an inorganic semiconductor, but embodiments according to the present disclosure are not limited thereto.

Each of the first to third pixels SP1, SP2, and SP3 may be connected to the scan initialization line GIL, the scan write line GWL, the scan control line GCL, the sweep line SWPL, the PWM emission line PWEL, and the PAM emission line PAEL. The first pixel SP1 may be connected to a first data line DL1 and a first PAM data line RDL. The second pixel SP2 may be connected to a second data line DL2 and a second PAM data line GDL. The third pixel SP3 may be connected to a third data line DL3 and a third PAM data line BDL.

A non-display area NDA of the display panel 100 may include the gate driver 110 configured to supply signals to the scan initialization line GIL, the scan write line GWL, the scan control line GCL, the sweep line SWPL, the PWM emission line PWEL, and the PAM emission line PAEL. For example, the gate driver 110 may be located at one edge of the non-display area NDA or both edges of the non-display area NDA. As another example, the gate driver 110 may be located in the display area DA.

The gate driver 110 may receive a gate control signal GCS from a timing controller 300. The gate control signal GCS may include first and second scan driving control signals, a sweep control signal, and first and second emission control signals.

The gate driver 110 may include a first scan signal output unit 111, a second scan signal output unit 112, a sweep signal output unit 113, and an emission signal output unit 114.

The first scan signal output unit 111 may receive the first scan driving control signal from the timing controller 300. The first scan signal output unit 111 may supply a scan initialization signal to the scan initialization line GIL and supply a scan write signal to the scan write line GWL based on the first scan driving control signal. Accordingly, the first scan signal output unit 111 may output the scan initialization signal and the scan write signal together.

The second scan signal output unit 112 may receive the second scan driving control signal from the timing controller 300. The second scan signal output unit 112 may output a scan control signal to the scan control line GCL based on the second scan driving control signal.

The sweep signal output unit 113 may receive the sweep control signal from the timing controller 300. The sweep signal output unit 113 may supply a sweep signal to the sweep line SWPL based on the sweep control signal.

The emission signal output unit 114 may receive the first and second emission control signals from the timing controller 300. The emission signal output unit 114 may supply a PWM emission signal to the PWM emission line PWEL based on the first emission control signal, and may supply a PAM emission signal to the PAM emission line PAEL based on the second emission control signal.

The data driver 200 may receive digital video data DATA and a data control signal DCS from the timing controller 300. The data driver 200 may convert the digital video data DATA into analog data voltages and output them to the data lines DL. The first to third pixels SP1, SP2, and SP3 may be selected by the scan write signals of the gate driver 110, and the selected first to third pixels SP1, SP2, and SP3 may receive the data voltages.

The timing controller 300 may receive the digital video data DATA and timing signals TS. The timing controller 300 may generate the gate control signal GCS based on the timing signals TS to control an operation timing of the gate driver 110. The timing controller 300 may generate the data control signal DCS based on the timing signals TS to control an operation timing of the data driver 200. The timing controller 300 may supply the digital video data DATA to the data driver 200.

The power supply unit 400 may commonly supply a first PAM data voltage to the first PAM data lines RDL, commonly supply a second PAM data voltage to the second PAM data lines GDL, and commonly supply a third PAM data voltage to the third PAM data lines BDL. The power supply unit 400 may generate a plurality of power voltages and output them to the display panel 100.

The power supply unit 400 may supply a first power voltage VDD1, a second power voltage VDD2, a third power voltage VSS, an initialization voltage VINT, a gate-on voltage VGL, and a gate-off voltage VGH to the display panel 100. The first power voltage VDD1 and the second power voltage VDD2 may be high-potential voltages for driving the light emitting elements of the first to third pixels SP1, SP2, and SP3. The third power voltage VSS may be a low-potential voltage for driving the light emitting elements of the first to third pixels SP1, SP2, and SP3. The initialization voltage VINT and the gate-off voltage VGH may be applied to each of the first to third pixels SP1, SP2, and SP3, and the gate-on voltage VGL and the gate-off voltage VGH may be applied to the gate driver 110.

Figure 2:
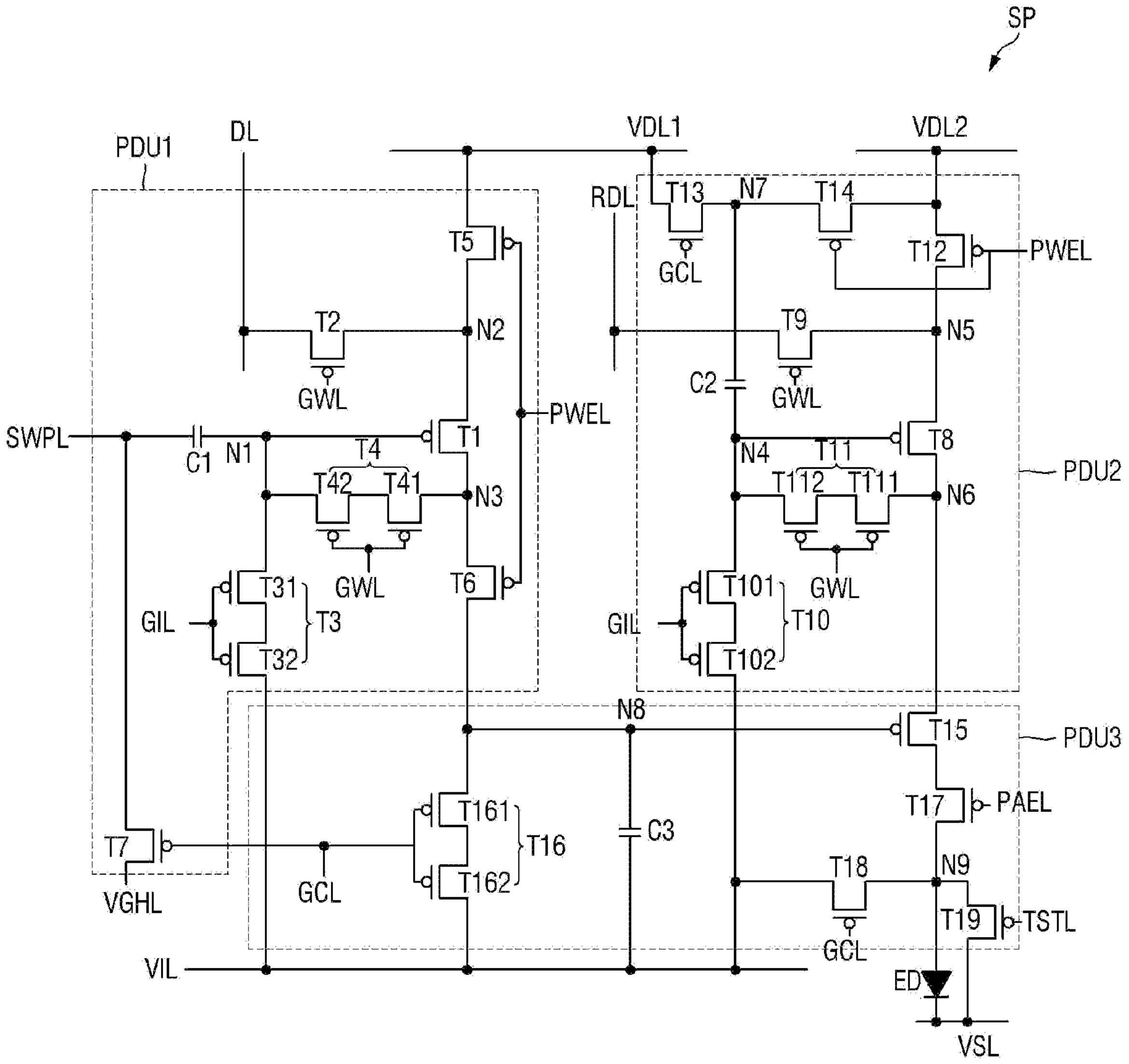
FIG. 2 is a circuit diagram showing a pixel according to some embodiments.

FIG. 2 is a circuit diagram showing a pixel according to some embodiments.

Referring to FIG. 2, the pixel SP may include a first pixel driver PDU1, a second pixel driver PDU2, a third pixel driver PDU3, and a light emitting element ED. The first pixel driver PDU1 may include first to seventh transistors T1 to T7 and a first capacitor C1.

The first transistor T1 may control the control current supplied to an eighth node N8 of the third pixel driver PDU3 based on the voltage of a first node N1 which serves as a gate electrode of the first transistor T1. The second transistor T2 may be turned on based on the scan write signal of the scan write line GWL to supply the data voltage received from the data line DL to a second node N2 which serves as a first electrode of the first transistor T1. The third transistor T3 may be turned on based on the scan initialization signal of the scan initialization line GIL to discharge the first node N1 to the initialization voltage VINT. For example, the third transistor T3 may include a third-first transistor T31 and a third-second transistor T32 connected in series. The fourth transistor T4 may be turned on based on the scan write signal of the scan write line GWL to electrically connect the first node N1 serving as the gate electrode of the first transistor T1 to the third node N3 serving as a second electrode of the first transistor T1. For example, the fourth transistor T4 may include a fourth-first transistor T41 and a fourth-second transistor T42 connected in series.

The fifth transistor T5 may be turned on based on the PWM emission signal of the PWM emission line PWEL to electrically connect a first power line VDL1 to the second node N2. The sixth transistor T6 may be turned on based on the PWM emission signal of the PWM emission line PWEL to electrically connect the third node N3 to the eighth node N8 of the third pixel driver PDU3. The seventh transistor T7 may be turned on based on the scan control signal of the scan control line GCL to supply the gate-off voltage VGH of a gate-off voltage line VGHL to a second capacitor electrode of the first capacitor C1 connected to the sweep line SWPL. The first capacitor C1 may be connected between the first node N1 and the sweep line SWPL.

The second pixel driver PDU2 may include eighth to fourteenth transistors T8 to T14 and a second capacitor C2.

The eighth transistor T8 may control the driving current flowing to the light emitting element ED based on the voltage of a fourth node N4 serving as a gate electrode thereof. The ninth transistor T9 may be turned on based on the scan write signal of the scan write line GWL to supply the first PAM data voltage of the first PAM data line RDL to a fifth node N5 serving as a first electrode of the eighth transistor T8. The tenth transistor T10 may be turned on based on the scan initialization signal of the scan initialization line GIL to discharge the fourth node N4 to the initialization voltage VINT. For example, the tenth transistor T10 may include a tenth-first transistor T101 and a tenth-second transistor T102 connected in series. The eleventh transistor T11 may be turned on based on the scan write signal of the scan write line GWL to electrically connect the fourth node N4 serving as the gate electrode of the eighth transistor T8 to a sixth node N6 serving as a second electrode of the eighth transistor T8. For example, the eleventh transistor T11 may include an eleventh-first transistor T111 and an eleventh-second transistor T112 connected in series.

The twelfth transistor T12 may be turned on based on the PWM emission signal of the PWM emission line PWEL to electrically connect a second power line VDL2 to the fifth node N5. The thirteenth transistor T13 may be turned on based on the scan control signal of the scan control line GCL to electrically connect the first power line VDL1 to a seventh node N7 serving as a second electrode of the second capacitor C2. The fourteenth transistor T14 may be turned on based on the PWM emission signal of the PWM emission line PWEL to electrically connect the second power line VDL2 to the seventh node N7. The second capacitor C2 may be connected between the fourth node N4 and the seventh node N7.

The third pixel driver PDU3 may include fifteenth to nineteenth transistors T15 to T19 and a third capacitor C3.

The fifteenth transistor T15 may control a period in which the driving current flows, based on the control current received by the eighth node N8 serving as a gate electrode thereof. The sixteenth transistor T16 may be turned on based on the scan control signal of the scan control line GCL to discharge the eighth node N8 to the initialization voltage VINT. For example, the sixteenth transistor T16 may include a sixteenth-first transistor T161 and a sixteenth-second transistor T162 connected in series. The seventeenth transistor T17 may be turned on based on the PAM emission signal of the PAM emission line PAEL to electrically connect a second electrode of the fifteenth transistor T15 to a ninth node N9 serving as a first electrode of the light emitting element ED. The eighteenth transistor T18 may be turned on based on the scan control signal of the scan control line GCL to discharge the ninth node N9 to the initialization voltage VINT. The nineteenth transistor T19 may be turned on based on a test signal of a test signal line TSTL to electrically connect the ninth node N9 to a third power line VSL. The third capacitor C3 may be connected between the eighth node N8 and the initialization voltage line VIL.

The light emitting element ED may be connected between the ninth node N9 and the third power line VSL. The light emitting element ED may be an inorganic light emitting element including a first electrode, a second electrode, and an inorganic semiconductor located between the first electrode and the second electrode. For example, the light emitting element ED may be a micro light emitting diode including an inorganic semiconductor, but embodiments according to the present disclosure are not limited thereto.

By way of example, one of the first electrode and the second electrode of each of the first to nineteenth transistors T1 to T19 may be a source electrode, and the other may be a drain electrode. Each of the first to nineteenth transistors T1 to T19 may be implemented as a P-type metal-oxide-semiconductor field-effect transistor (POSFET), but embodiments according to the present disclosure are not limited thereto. As another example, each of the first to nineteenth transistors T1 to T19 may be implemented as an N-type MOSFET.

The pixel SP of FIG. 2 may correspond to the first pixel SP1 connected to the first PAM data line RDL. Except that the second pixel SP2 is connected to the second PAM data line GDL and the third pixel SP3 is connected to the third PAM data line BDL, the second and third pixels SP2 and SP3 may have substantially the same circuit structure as the first pixel SP1.

Without being limited to the illustration of FIG. 2, semiconductor layers of some of the first to nineteenth transistors T1 to T19 may include polysilicon or amorphous silicon, and semiconductor layers of some others of the first to nineteenth transistors T1 to T19 may include an oxide-based semiconductor layer. When the semiconductor layer includes polysilicon, it may be formed by a low-temperature polysilicon (LTPS) process. The low-temperature polysilicon (LTPS)-based semiconductor layer may have high electron mobility and excellent turn-on characteristics. The oxide-based semiconductor layer may have a relatively small S-factor, and may be capable of increasing a constant current driving region in a low grayscale region and capable of improving expression of low gray levels.

Figure 3A:
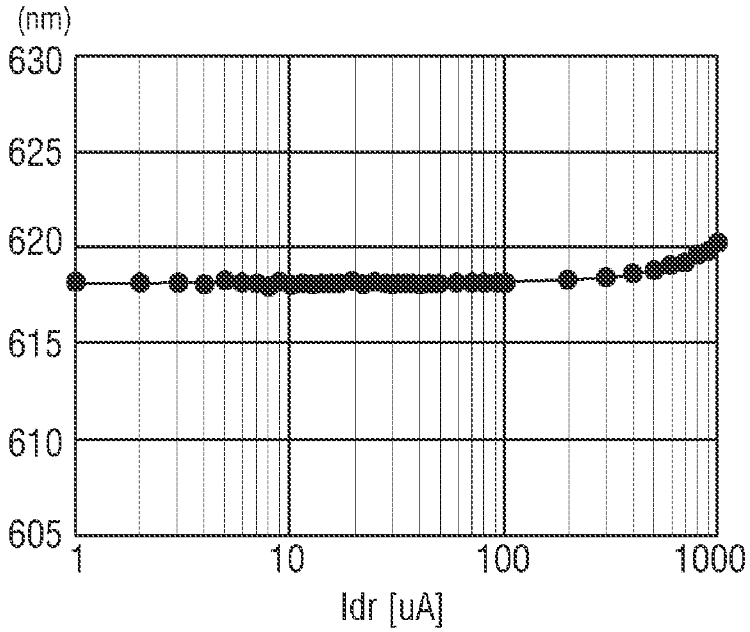
FIGS. 3A to 3C are graphs illustrating wavelengths of lights emitted from light emitting elements of first to third pixels in a display device according to some embodiments.
Figure 3B:
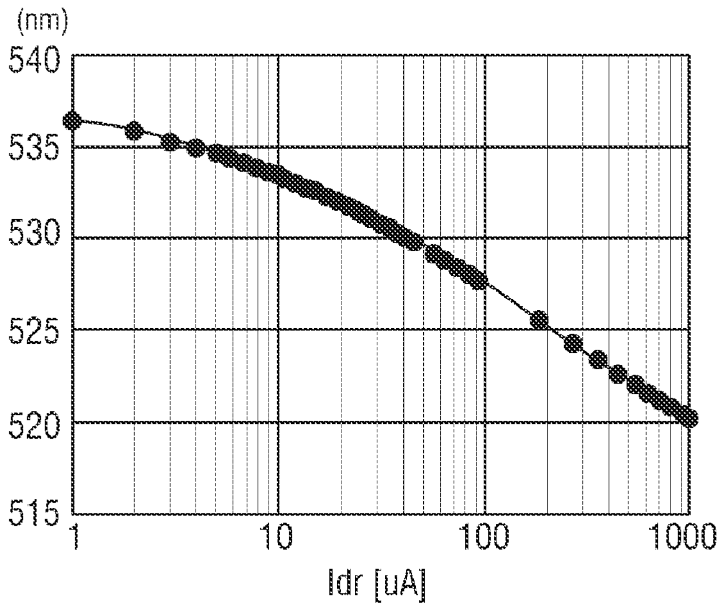
Figure 3C:
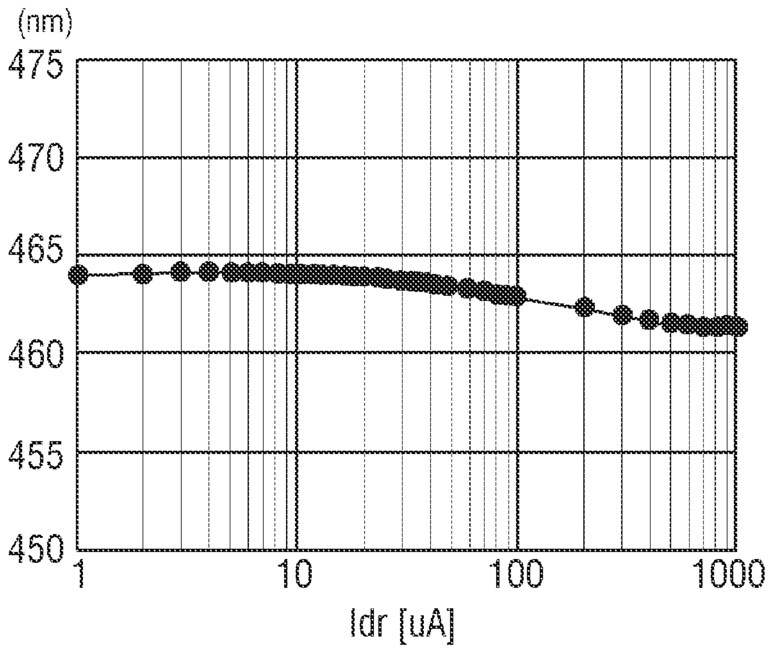

FIGS. 3A to 3C are graphs illustrating wavelengths of lights emitted from light emitting elements of first to third pixels in a display device according to some embodiments. In each of FIGS. 3A to 3C, the horizontal axis represents the magnitude of a driving current Idr, and the vertical axis represents the wavelength of the light emitted from the light emitting element ED.

FIG. 3A illustrates the wavelength of the light emitted by the light emitting element ED of the first pixel SP1 in response to the driving current Idr when the light emitting element ED of the first pixel SP1 includes an inorganic material such as, but not limited to, GaN. FIG. 3B illustrates the wavelength of the light emitted by the light emitting element ED of the second pixel SP2 in response to the driving current Idr when the light emitting element ED of the second pixel SP2 includes an inorganic material such as, but not limited to, GaN. FIG. 3C illustrates the wavelength of the light emitted by the light emitting element ED of the third pixel SP3 in response to the driving current Idr when the light emitting element ED of the third pixel SP3 includes an inorganic material such as, but not limited to, GaN.

In FIG. 3A, when the magnitude of the driving current Idr applied to the light emitting element ED of the first pixel SP1 is in the range of 1 μA to 300 μA, the wavelength of the light emitted from the light emitting element ED of the first pixel SP1 is maintained constant at about 618 nm. As the magnitude of the driving current Idr applied to the light emitting element ED of the first pixel SP1 increases from 300 μA to 1000 μA, the wavelength of the light emitted from the light emitting element ED of the first pixel SP1 increases from about 618 nm to about 620 nm.

In FIG. 3B, as the magnitude of the driving current Idr applied to the light emitting element ED of the second pixel SP2 increases from 1 μA to 1000 μA, the wavelength of light emitted from the light emitting element ED of the second pixel SP2 decreases from about 536 nm to about 520 nm.

In FIG. 3C, as the magnitude of the driving current Idr applied to the light emitting element ED of the third pixel SP3 increases from 1 μA to 1000 μA, the wavelength of light emitted from the light emitting element ED of the third pixel SP3 decreases from about 464 nm to about 461 nm.

The wavelength of the light emitted from the light emitting element ED of the first pixel SP1 and the wavelength of the light emitted from the light emitting element ED of the third pixel SP3 hardly change even if the magnitude of the driving current Idr changes. The wavelength of the light emitted from the light emitting element ED of the second pixel SP2 is inversely proportional to the magnitude of the driving current Idr. Accordingly, when the magnitude or amplitude of the driving current Idr applied to the light emitting element ED of the second pixel SP2 is adjusted, the wavelength of the light emitted from the light emitting element ED of the second pixel SP2 may be changed, so the color coordinates of the image displayed by the display panel 100 may be changed.

Figure 4A:
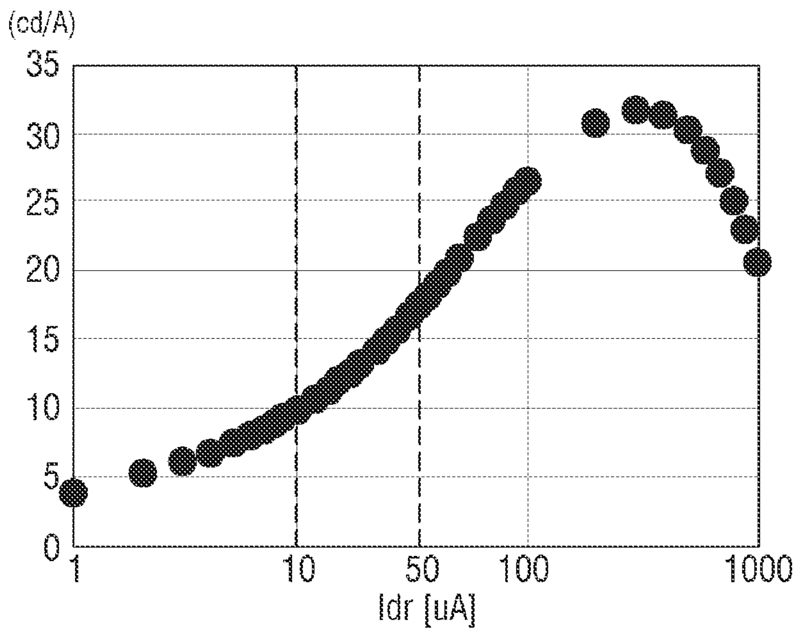
FIGS. 4A to 4C are graphs illustrating luminous efficiency of light emitting elements of first to third pixels in a display device according to some embodiments.
Figure 4B:
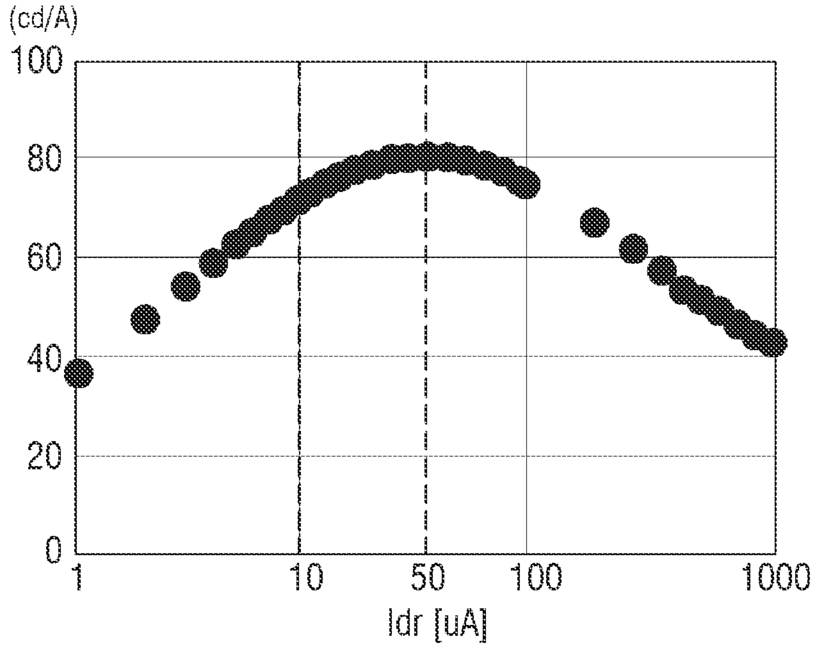
Figure 4C:
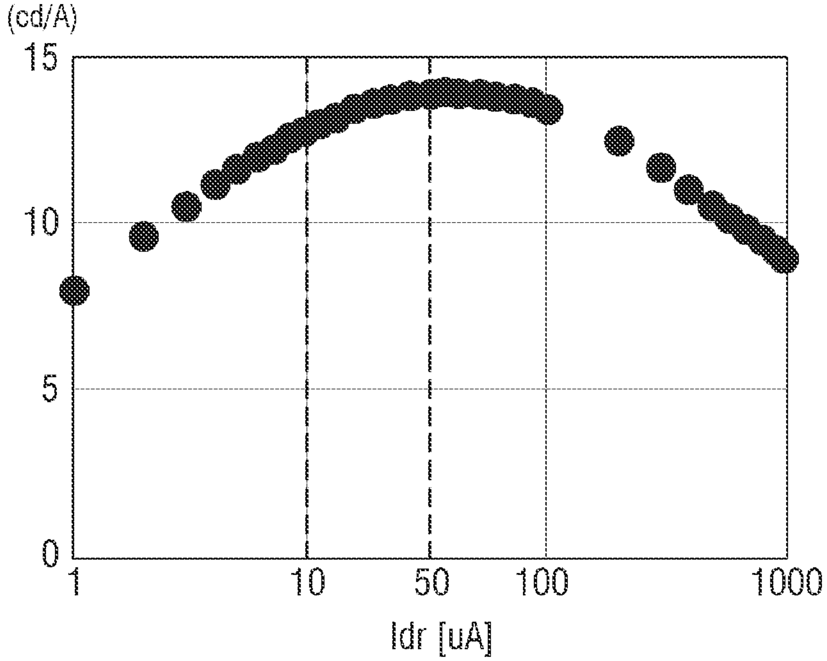

FIGS. 4A to 4C are graphs illustrating luminous efficiency of light emitting elements of first to third pixels in a display device according to some embodiments. In each of FIGS. 4A to 4C, the horizontal axis represents the magnitude of the driving current Idr, and the vertical axis represents the luminous efficiency of the light emitting element ED.

FIG. 4A illustrates the luminous efficiency of the light emitting element ED of the first pixel SP1 according to the driving current Idr when the light emitting element ED of the first pixel SP1 includes an inorganic material. FIG. 4B shows the luminous efficiency of the light emitting element ED of the second pixel SP2 according to the driving current Idr when the light emitting element ED of the second pixel SP2 includes an inorganic material. FIG. 4C illustrates the luminous efficiency of the light emitting element ED of the third pixel SP3 according to the driving current Idr when the light emitting element ED of the third pixel SP3 includes an inorganic material.

In FIG. 4A, when the magnitude of the driving current Idr applied to the light emitting element ED of the first pixel SP1 is 10 μA, the luminous efficiency of the light emitting element ED of the first pixel SP1 is about 9.5 cd/A. When the magnitude of the driving current Idr applied to the light emitting element ED of the first pixel SP1 is 50 μA, the luminous efficiency of the light emitting element ED of the first pixel SP1 is about 18 cd/A. Thus, when the magnitude of the driving current Idr is 50 μA, the luminous efficiency of the light emitting element ED of the first pixel SP1 increases by about 1.9 times as compared to the case when the magnitude of the driving current Dr is 10 μA.

In FIG. 4B, when the magnitude of the driving current Idr applied to the light emitting element ED of the second pixel SP2 is 10 μA, the luminous efficiency of the light emitting element ED of the second pixel SP2 is about 72 cd/A. When the magnitude of the driving current Idr applied to the light emitting element ED of the second pixel SP2 is 50 μA, the luminous efficiency of the light emitting element ED of the second pixel SP2 is about 80 cd/A. Thus, when the magnitude of the driving current Idr is 50 μA, the luminous efficiency of the light emitting element ED of the second pixel SP2 increases by about 1.9 times as compared to the case when the magnitude of the driving current Idr is 10 μA.

In FIG. 4C, when the magnitude of the driving current Idr applied to the light emitting element ED of the third pixel SP3 is 10 μA, the luminous efficiency of the light emitting element ED of the third pixel SP3 is about 13.2 cd/A. When the magnitude of the driving current Idr applied to the light emitting element ED of the third pixel SP3 is 50 μA, the luminous efficiency of the light emitting element ED of the third pixel SP3 is about 14 cd/A. Thus, when the magnitude of the driving current Idr is 50 μA, the luminous efficiency of the light emitting element ED of the third pixel SP3 increases by about 1.06 times as compared to the case when the magnitude of the driving current Idr is 10 μA.

As stated above, the luminous efficiency of the light emitting element ED of each of the first to third pixels SP1, SP2, and SP3 may vary depending on the magnitude of the driving current Idr.

In FIGS. 3A to 4C, when the magnitude of the driving current Idr applied to the light emitting element ED of the second pixel SP2 is adjusted, the color coordinates of the image displayed by the display panel 100 may be changed. The luminous efficiency of the light emitting element ED of each of the first to third pixels SP1, SP2, and SP3 may vary depending on the magnitude of the driving current Idr. Thus, if the magnitude of the driving current Idr of each of the first to third pixels SP1, SP2, and SP3 is maintained constant and the luminance of each of the first to third pixels SP1, SP2, and SP3 is adjusted by adjusting the period in which the driving current Idr is applied, the color coordinates of the image displayed by the display panel 100 may be maintained constant, and the light emitting element ED of each of the first to third pixels SP1, SP2, and SP3 may have optimal luminous efficiency.

In FIG. 2, the second pixel driver PDU2 of the first pixel SP1 generates the driving current Idr based on the first PAM data voltage of the first PAM data line RDL, thus allowing the light emitting element ED of the first pixel SP1 to be driven with optimized luminous efficiency. The first pixel driver PDU1 of the first pixel SP1 may generate a control current Ic based on the data voltage of the data line DL to control the voltage of the eighth node N8 of the third pixel driver PDU3, and the third pixel driver PDU3 may adjust the period in which the driving current Idr is applied to the light emitting element ED based on the voltage of the eighth node N8. Thus, the first pixel SP1 may generate the constant driving current Idr to drive the light emitting element ED with the optimized luminous efficiency, and may control the luminance of the light emitted from the light emitting element ED by adjusting the duty ratio of the light emitting element ED, that is, the period in which the driving current Idr is applied to the light emitting element ED.

The second pixel driver PDU2 of the second pixel SP2 may generate the driving current Idr based on the second PAM data voltage of the second PAM data line GDL, thus allowing the light emitting element ED of the second pixel SP2 to be driven with optimized luminous efficiency. The first pixel driver PDU1 of the second pixel SP2 may generate the control current Ic in response to the data voltage of the data line DL to control the voltage of the eighth node N8 of the third pixel driver PDU3, and the third pixel driver PDU3 may adjust the period in which the driving current Idr is applied to the light emitting element ED based on the voltage of the eighth node N8. Thus, the second pixel SP2 may generate the constant driving current Idr to drive the light emitting element ED with optimized luminous efficiency, and may control the luminance of the light emitted from the light emitting element ED by adjusting the duty ratio of the light emitting element ED, that is, the period in which the driving current Idr is applied to the light emitting element ED.

The second pixel driver PDU2 of the third pixel SP3 may generate the driving current Idr based on the third PAM data voltage of the third PAM data line BDL, thus allowing the light emitting element ED of the third pixel SP3 to be driven with optimized luminous efficiency. The first pixel driver PDU1 of the third pixel SP3 may generate the control current Ic in response to the data voltage of the data line DL to control the voltage of the eighth node N8 of the third pixel driver PDU3, and the third pixel driver PDU3 may adjust the period in which the driving current Idr is applied to the light emitting element ED based on the voltage of the eighth node N8. Thus, the third pixel SP3 may generate the constant driving current Idr to drive the light emitting element ED with optimized luminous efficiency, and may control the luminance of the light emitted from the light emitting element ED by adjusting the duty ratio of the light emitting element ED, that is, the period in which the driving current Idr is applied to the light emitting element ED.

Therefore, the display device may reduce or prevent deterioration of the image quality that might be caused by fluctuations in the wavelength of the emitted light due to the driving current Idr applied to the light emitting element ED. The light emitting elements ED of the first to third pixels SP1, SP2, and SP3 may emit lights with optimized luminous efficiency, while minimizing luminance discrepancy.

Figure 5:
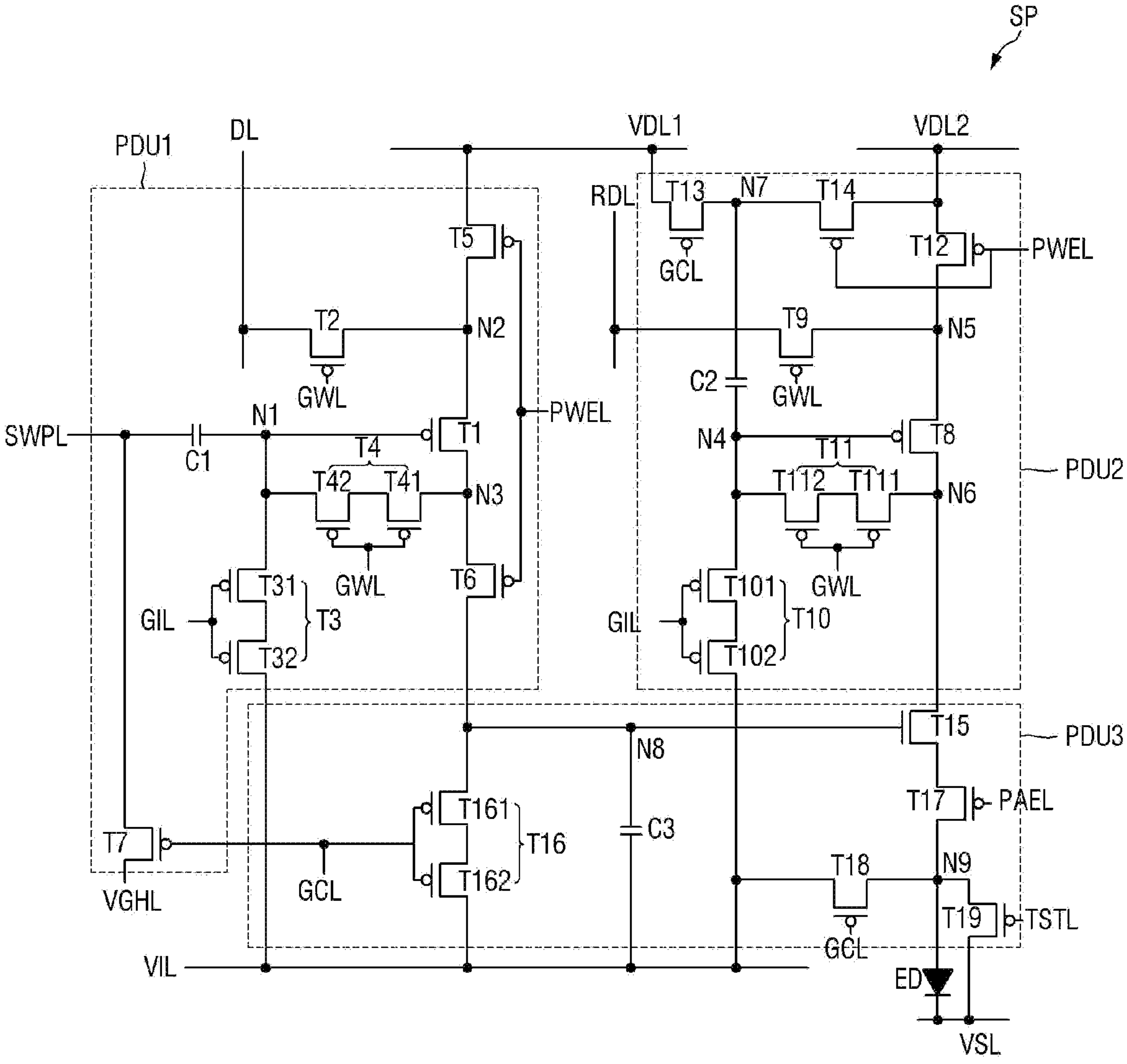
FIG. 5 is a circuit diagram showing a pixel according to some embodiments.

FIG. 5 is a circuit diagram showing a pixel according to some embodiments.

Referring to FIG. 5, the pixel SP may be connected to the scan initialization line GIL, the scan write line GWL, the scan control line GCL, the sweep line SWPL, the PWM light emission line PWEL, and the PAM light emission line PAEL. The first pixel SP1 may be connected to the data line DL and the first PAM data line RDL. The second pixel SP2 may be connected to the data line DL and the second PAM data line GDL. The third pixel SP3 may be connected to the data line DL and the third PAM data line BDL. Here, the data line DL may be a first data line, and one of the first to third PAM data lines RDL, GDL, and BDL may be a second data line. The data voltage of the data line DL may be a first data voltage, and one of the first to third PAM data voltages may be a second data voltage. The pixel SP may be connected to the first power line VDL1 to which the first power voltage VDD1 is applied, the second power line VDL2 to which the second power voltage VDD2 is applied, the third power line VSL to which the third power voltage VSS is applied, the initialization voltage line VIL to which the initialization voltage VINT is applied, and a gate-off voltage line VGHL to which the gate-off voltage VGH is applied.

The pixel SP may include the first pixel driver PDU1, the second pixel driver PDU2, the third pixel driver PDU3, and the light emitting element ED.

The light emitting element ED may receive the driving current Idr generated by the second pixel driver PDU2 to emit light. The light emitting element ED may be located between the ninth node N9 and the third power line VSL. The first electrode of the light emitting element ED may be connected to the ninth node N9 serving as a second electrode of the seventeenth transistor T17, and the second electrode of the light emitting element ED may be connected to the third power line VSL. The first electrode of the light emitting element ED may be an anode electrode and the second electrode thereof may be a cathode electrode. The light emitting element ED may be an inorganic light emitting element including a first electrode, a second electrode, and an inorganic semiconductor located between the first electrode and the second electrode. For example, the light emitting element ED may be a micro LED including an inorganic semiconductor, but embodiments according to the present disclosure are not limited thereto.

The first pixel driver PDU1 may generate the control current Ic based on the data voltage of the data line DL to control the voltage of the eighth node N8 of the third pixel driver PDU3. The control current Ic of the first pixel driver PDU1 may adjust the pulse width of the voltage applied to the first electrode of the light emitting element ED. The first pixel driver PDU1 may perform pulse width modulation of the voltage applied to the first electrode of the light emitting element ED. Therefore, the first pixel driver PDU1 may be a pulse width modulation (PWM) unit.

The first pixel driver PDU1 may include the first to seventh transistors T1 to T7 and the first capacitor C1.

The first transistor T1 may control the control current Ic flowing between the first electrode and the second electrode thereof based on the data voltage applied to the first node N1 which serves as the gate electrode thereof.

The second transistor T2 may be turned on based on the scan write signal of the scan write line GWL to supply the data voltage of the data line DL to the second node N2 serving as the first electrode of the first transistor T1. The gate electrode of the second transistor T2 may be connected to the scan write line GWL, the first electrode thereof may be connected to the data line DL, and the second electrode thereof may be connected to the second node N2.

The third transistor T3 may be turned on based on the scan initialization signal of the scan initialization line GIL to electrically connect the scan initialization line GIL to the first node N1. During the turn-on period of the third transistor T3, the first node N1 that is the gate electrode of the first transistor T1 may be discharged to the initialization voltage VINT of the initialization voltage line VIL. The gate-on voltage VGL of the scan initialization signal may be different from the initialization voltage VINT of the initialization voltage line VIL. Because the difference voltage between the initialization voltage VINT and the gate-on voltage VGL is larger than the threshold voltage of the third transistor T3, the third transistor T3 may be stably turned on even after the initialization voltage VINT is applied to the first node N1. Therefore, when the third transistor T3 is turned on, the first node N1 may stably receive the initialization voltage VINT regardless of the threshold voltage of the third transistor T3.

The third transistor T3 may include a plurality of transistors connected in series. For example, the third transistor T3 may include the third-first transistor T31 and the third-second transistor T32. The third-first and third-second transistors T31 and T32 may prevent the voltage of the first node N1 from leaking through the third transistor T3. The gate electrode of the third-first transistor T31 may be connected to the scan initialization line GIL, the first electrode thereof may be connected to the first node N1, and the second electrode thereof may be connected to a first electrode of the third-second transistor T32. The gate electrode of the third-second transistor T32 may be connected to the scan initialization line GIL, the first electrode thereof may be connected to the second electrode of the third-first transistor T31, and the second electrode thereof may be connected to the initialization voltage line VIL.

The fourth transistor T4 may be turned on based on the scan write signal of the scan write line GWL to electrically connect the first node N1 serving as the gate electrode of the first transistor T1 to the third node N3 serving as the second electrode of the first transistor T1. Therefore, during the turn-on period of the fourth transistor T4, the first transistor T1 may operate as a diode.

The fourth transistor T4 may include a plurality of transistors connected in series. For example, the fourth transistor T4 may include the fourth-first transistor T41 and the fourth-second transistor T42. The fourth-first and fourth-second transistors T41 and T42 may prevent the voltage of the first node N1 from leaking through the fourth transistor T4. The gate electrode of the fourth-first transistor T41 may be connected to the scan write line GWL, the first electrode thereof may be connected to the third node N3, and the second electrode thereof may be connected to the first electrode of the fourth-second transistor T42. The gate electrode of the fourth-second transistor T42 may be connected to the scan write line GWL, the first electrode thereof may be connected to the second electrode of the fourth-first transistor T41, and the second electrode thereof may be connected to the first node N1.

The fifth transistor T5 may be turned on based on the PWM emission signal of the PWM emission line PWEL to electrically connect the first power line VDL1 to the second node N2 that is the first electrode of the first transistor T1. The gate electrode of the fifth transistor T5 may be connected to the PWM emission line PWEL, the first electrode thereof may be connected to the first power line VDL1, and the second electrode thereof may be connected to the second node N2.

The sixth transistor T6 may be turned on based on the PWM emission signal of the PWM emission line PWEL to electrically connect the third node N3 that is the second electrode of the first transistor T1 to the eighth node N8 of the third pixel driver PDU3. The gate electrode of the sixth transistor T6 may be connected to the PWM emission line PWEL, the first electrode thereof may be connected to the third node N3, and the second electrode thereof may be connected to the eighth node N8. Therefore, the sixth transistor T6 may supply the control current Ic to the eighth node N8 serving as a gate electrode of the fifteenth transistor T15, and the fifteenth transistor T15 may be turned on based on the voltage of the eighth node N8 to thereby adjust the pulse width of the voltage applied to the first electrode of the light emitting element ED.

The seventh transistor T7 may be turned on based on the scan control signal of the scan control line GCL to supply the gate-off voltage VGH of the gate-off voltage line VGHL to the second capacitor electrode of the first capacitor C1 connected to the sweep line SWPL. Therefore, it is possible to prevent the change in the voltage of the gate electrode of the first transistor T1 from being reflected in the sweep signal of the sweep line SWPL by the first capacitor C1 during the period in which the initialization voltage VINT is applied to the gate electrode of the first transistor T1 and the period in which the data voltage of the data line DL and a threshold voltage Vth of the first transistor T1 are programmed. The gate electrode of the seventh transistor T7 may be connected to the scan control line GCL, the first electrode thereof may be connected to the gate-off voltage line VGHL, and the second electrode thereof may be connected to the sweep line SWPL.

The first capacitor C1 may be connected between the first node N1 and the sweep line SWPL. The first capacitor electrode of the first capacitor C1 may be connected to the first node N1, and the second capacitor electrode thereof may be connected to the sweep line SWPL. The first capacitor C1 may maintain a potential difference between the first node N1 and the sweep line SWPL.

The second pixel driver PDU2 may generate the driving current Idr supplied to the light emitting element ED based on the first PAM data voltage of the first PAM data line RDL. The second pixel driver PDU2 may be a pulse amplitude modulation (PAM) unit for performing pulse amplitude modulation. The second pixel driver PDU2 may be a constant current generator that receives the same PAM data voltage and generates the same driving current Idr regardless of the luminance of the first to third pixels SP1, SP2, and SP3.

The second pixel driver PDU2 may include the eighth to fourteenth transistors T8 to T14 and the second capacitor C2.

The eighth transistor T8 may control the driving current Idr flowing between the first electrode and the second electrode thereof based on the first PAM data voltage applied to the fourth node N4 which serves as the gate electrode thereof.

The ninth transistor T9 may be turned on by the scan write signal of the scan write line GWL to supply the first PAM data voltage of the first PAM data line RDL to the fifth node N5 that is the first electrode of the eighth transistor T8. The gate electrode of the ninth transistor T9 may be connected to the scan write line GWL, the first electrode thereof may be connected to the first PAM data line RDL, and the second electrode thereof may be connected to the fifth node N5.

The tenth transistor T10 may be turned on based on the scan initialization signal of the scan initialization line GIL to electrically connect the fourth node N4 to the initialization voltage line VIL. During the turn-on period of the tenth transistor T10, the fourth node N4 may be discharged to the initialization voltage VINT. The gate-on voltage VGL of the scan initialization signal may be different from the initialization voltage VINT. Because the difference voltage between the initialization voltage VINT and the gate-on voltage VGL is larger than the threshold voltage of the tenth transistor T10, the tenth transistor T10 may be stably turned on even after the initialization voltage VINT is applied to the fourth node N4. Therefore, when the tenth transistor T10 is turned on, the fourth node N4 may stably receive the initialization voltage VINT regardless of the threshold voltage of the tenth transistor T10.

The tenth transistor T10 may include a plurality of transistors connected in series. For example, the tenth transistor T10 may include a tenth-first transistor T101 and a tenth-second transistor T102. The tenth-first and tenth-second transistors T101 and T102 may prevent the voltage of the fourth node N4 from leaking through the tenth transistor T10. The gate electrode of the tenth-first transistor T101 may be connected to the scan initialization line GIL, the first electrode thereof may be connected to the fourth node N4, and the second electrode thereof may be connected to a first electrode of the tenth-second transistor T102. The gate electrode of the tenth-second transistor T102 may be connected to the scan initialization line GIL, the first electrode thereof may be connected to the second electrode of the tenth-first transistor T101, and the second electrode thereof may be connected to the initialization voltage line VIL.

The eleventh transistor T11 may be turned on based on the scan write signal of the scan write line GWL to electrically connect the fourth node N4 serving as the gate electrode of the eighth transistor T8 to the sixth node N6 serving as the second electrode of the eighth transistor T8. Therefore, during the turn-on period of the eleventh transistor T11, the eighth transistor T8 may operate as a diode.

The eleventh transistor T11 may include a plurality of transistors connected in series. For example, the eleventh transistor T11 may include an eleventh-first transistor T111 and an eleventh-second transistor T112. The eleventh-first and eleventh-second transistors T111 and T112 may prevent the voltage of the fourth node N4 from leaking through the eleventh transistor T11. The gate electrode of the eleventh-first transistor T111 may be connected to the scan write line GWL, the first electrode thereof may be connected to the sixth node N6, and the second electrode thereof may be connected to a first electrode of the eleventh-second transistor T112. The gate electrode of the eleventh-second transistor T112 may be connected to the scan write line GWL, the first electrode thereof may be connected to the second electrode of the eleventh-first transistor T111, and the second electrode thereof may be connected to the fourth node N4.

The twelfth transistor T12 may be turned on based on the PWM emission signal of the PWM emission line PWEL to electrically connect the second power line VDL2 to the fifth node N5 which serves as the first electrode of the eighth transistor T8. The gate electrode of the twelfth transistor T12 may be connected to the PWM emission line PWEL, the first electrode thereof may be connected to the second power line VDL2, and the second electrode thereof may be connected to the fifth node N5.

The thirteenth transistor T13 may be turned on based on the scan control signal of the scan control line GCL to electrically connect the first power line VDL1 to the seventh node N7 which serves as the second capacitor electrode of the second capacitor C2. The gate electrode of the thirteenth transistor T13 may be connected to the scan control line GCL, the first electrode thereof may be connected to the first power line VDL1, and the second electrode thereof may be connected to the seventh node N7.

The fourteenth transistor T14 may be turned on based on the PWM emission signal of the PWM emission line PWEL to electrically connect the second power line VDL2 to the seventh node N7 which serves as the second capacitor electrode of the second capacitor C2. The gate electrode of the fourteenth transistor T14 may be connected to the PWM emission line PWEL, the first electrode thereof may be connected to the second power line VDL2, and the second electrode thereof may be connected to the seventh node N7.

The second capacitor C2 may be connected between the fourth node N4 serving as the gate electrode of the eighth transistor T8 and the seventh node N7 serving as the second electrode of the thirteenth transistor T13. The first capacitor electrode of the second capacitor C2 may be connected to the fourth node N4, and the second capacitor electrode thereof may be connected to the seventh node N7. The second capacitor C2 may maintain the potential difference between the fourth node N4 and the seventh node N7. The second capacitor C2 may control the voltage of the fourth node N4 based on the voltage variation of the seventh node N7.

The third pixel driver PDU3 may adjust the period in which the driving current Idr is applied to the light emitting element ED based on the voltage of the eighth node N8.

The third pixel driver PDU3 may include the fifteenth to nineteenth transistors T15 to T19 and the third capacitor C3.

The fifteenth transistor T15 may control the period in which the driving current Idr flows based on the voltage applied to the eighth node N8 which serves as the gate electrode. The fifteenth transistor T15 may control the period in which the driving current Idr is supplied to the light emitting element ED based on the voltage of the eighth node N8.

The fifteenth transistor T15 may include an oxide-based semiconductor layer. For example, the fifteenth transistor T15 may have a coplanar structure in which a gate electrode is located on an oxide-based semiconductor layer, but embodiments according to the present disclosure are not limited thereto. The fifteenth transistor T15 may include an oxide-based semiconductor layer, and thus may have an S-factor smaller than that of the transistors including polysilicon-based semiconductor layers. As the fifteenth transistor T15 has a relatively small S-factor, a constant current driving region in a low grayscale region may be increased, and expression of low gray levels may be improved. As the fifteenth transistor T15 is capable of maintaining a turn-off state at peak black grayscale and has excellent leakage current characteristics, expression of the peak black grayscale can be improved. The fifteenth transistor T15 may prevent leakage current from being supplied to the light emitting element ED and may stably maintain the voltage inside a pixel circuit.

The sixteenth transistor T16 may be turned on based on the scan control signal of the scan control line GCL to electrically connect the eighth node N8 to the initialization voltage line VIL. During the turn-on period of the sixteenth transistor T16, the eighth node N8 may be discharged to the initialization voltage VINT. The gate-on voltage VGL of the scan control signal may be different from the initialization voltage VINT. Because the difference voltage between the initialization voltage VINT and the gate-on voltage VGL is larger than the threshold voltage of the sixteenth transistor T16, the sixteenth transistor T16 may be stably turned on even after the initialization voltage VINT is applied to the eighth node N8. Therefore, when the sixteenth transistor T16 is turned on, the eighth node N8 may stably receive the initialization voltage VINT regardless of the threshold voltage of the sixteenth transistor T16.

The sixteenth transistor T16 may include a plurality of transistors connected in series. For example, the sixteenth transistor T16 may include a sixteenth-first transistor T161 and a sixteenth-second transistor T162. The sixteenth-first and sixteenth-second transistors T161 and T162 may prevent the voltage of the eighth node N8 from leaking through the sixteenth transistor T16. The gate electrode of the sixteenth-first transistor T161 may be connected to the scan control line GCL, the first electrode thereof may be connected to the eighth node N8, and the second electrode thereof may be connected to the first electrode of the sixteenth-second transistor T162. The gate electrode of the sixteenth-second transistor T162 may be connected to the scan control line GCL, the first electrode thereof may be connected to the second electrode of the sixteenth-first transistor T161, and the second electrode thereof may be connected to the initialization voltage line VIL.

The seventeenth transistor T17 may be turned on based on the PAM emission signal of the PAM emission line PAEL to electrically connect the second electrode of the fifteenth transistor T15 to the ninth node N9 that is the first electrode of the light emitting element ED. The gate electrode of the seventeenth transistor T17 may be connected to the PAM emission line PAEL, the first electrode thereof may be connected to the second electrode of the fifteenth transistor T15, and the second electrode thereof may be connected to the ninth node N9.

The eighteenth transistor T18 may be turned on based on the scan control signal of the scan control line GCL to electrically connect the ninth node N9 serving as the first electrode of the light emitting element ED to the initialization voltage line VIL. During the turn-on period of the eighteenth transistor T18, the ninth node N9 may be discharged to the initialization voltage VINT. The gate electrode of the eighteenth transistor T18 may be connected to the scan control line GCL, the first electrode thereof may be connected to the ninth node N9, and the second electrode thereof may be connected to the initialization voltage line VIL.

The nineteenth transistor T19 may be turned on based on the test signal of the test signal line TSTL to electrically connect the ninth node N9 to the third power line VSL. The gate electrode of the nineteenth transistor T19 may be connected to the test signal line TSTL, the first electrode thereof may be connected to the ninth node N9, and the second electrode thereof may be connected to the third power line VSL.

The third capacitor C3 may be connected between the initialization voltage line VIL and the eighth node N8 serving as the gate electrode of the fifteenth transistor T15. The first capacitor electrode of the third capacitor C3 may be connected to the eighth node N8, and the second capacitor electrode thereof may be connected to the initialization voltage line VIL. The third capacitor C3 may maintain the potential difference between the eighth node N8 and the initialization voltage line VIL.

One of the first and second electrodes of each of the first to nineteenth transistors T1 to T19 may be a source electrode, and the other may be a drain electrode. For example, semiconductor layers of the first to fourteenth transistors T1 to T14 and the sixteenth to nineteenth transistors T16 to T19 may be formed of polysilicon or amorphous silicon. When the semiconductor layers of the first to fourteenth transistors T1 to T14 and the sixteenth to nineteenth transistors T16 to T19 are made of polysilicon, they may be formed by a low-temperature polysilicon (LTPS) process. As each of the first to fourteenth transistors T1 to T14 and the sixteenth to nineteenth transistors T16 to T19 includes a low-temperature polysilicon (LTPS)-based semiconductor layer, they may have high electron mobility and excellent turn-on characteristics. As the fifteenth transistor T15 includes an oxide-based semiconductor layer, it may have a relatively small S-factor, and may increase a constant current driving region in a low grayscale region while improving expression of low gray levels. The first to fourteenth transistors T1 to T14 and the sixteenth to nineteenth transistors T16 to T19 may be implemented as P-type MOSFETs, and the fifteenth transistor T15 may be implemented as an N-type MOSFET. The P-type MOSFET may be turned on based on a gate voltage of a gate low level, and the N-type MOSFET may be turned on based on a gate voltage of a gate high level. Therefore, the first to fourteenth transistors T1 to T14 and the sixteenth to nineteenth transistors T16 to T19 may be turned on when the source-gate voltage is larger than the threshold voltage, and the fifteenth transistor T15 may be turned on when the gate-source voltage is larger than the threshold voltage.

Without being limited to the example shown in FIG. 5, at least some of the first to fourteenth transistors T1 to T14 and the sixteenth to nineteenth transistors T16 to T19 may include an oxide-based semiconductor layer, and, thus, they may have a relatively small S-factor and be capable of increasing a constant current driving region in a low gray-scale region while improving expression of low gray levels. Some of the first to fourteenth transistors T1 to T14 and the sixteenth to nineteenth transistors T16 to T19 may be implemented as P-type MOSFETs, and the others of the first to fourteenth transistors T1 to T14 and the sixteenth to nineteenth transistors T16 to T19, and the fifteenth transistor T15 may be implemented as N-type MOSFETs. The P-type MOSFET may be turned on based on a gate voltage of a gate low level, and the N-type MOSFET may be turned on based on a gate voltage of a gate high level.

Figure 6:
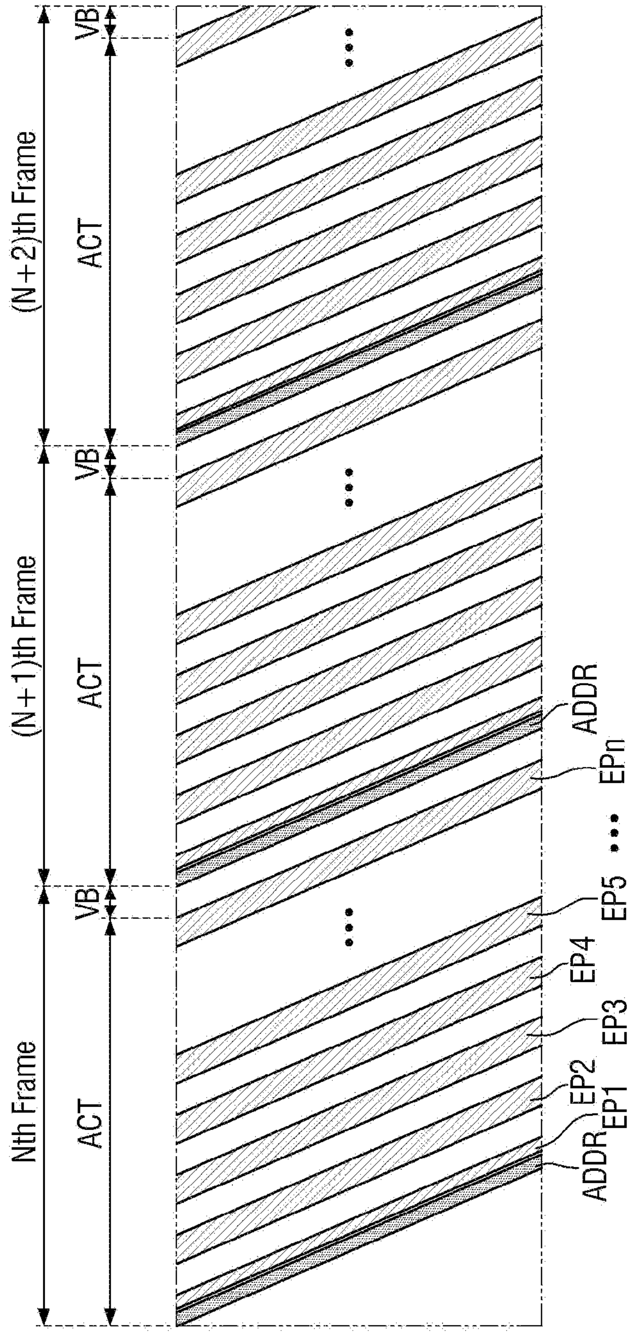
FIG. 6 is a diagram illustrating an example of operations in the $N^{th}$ to $(N^{+2})^{th}$ frame periods in a display device according to some embodiments.

FIG. 6 is a diagram illustrating an example of operations in the $N^{th}$ to $(N+2)^{th}$ frame periods in a display device according to some embodiments.

Referring to FIG. 6, each of the $N^{th}$ to $(N+2)^{th}$ frame periods may include an active period ACT and a blank period VB. The active period ACT may include an address period ADDR for supplying the data voltage and the first, second, or third PAM data voltage to each of the first to third pixels SP1, SP2, and SP3, and emission periods EP1, EP2, EP3, EP4, EP5, . . . , EPn in which the light emitting element ED of each of the pixels SP emits light. The blank period VB may be a period in which the pixels SP pause without performing any special operation.

For example, the address period ADDR and the first emission period EP1 may be about 5 horizontal periods, and each of the second to $n^{th}$ emission periods EP2, EP3, EP4, EP5, . . . , EPn may be about 12 horizontal periods, but are not limited thereto. The active period ACT may include 25 emission periods, but the number of emission periods EP1, EP2, EP3, EP4, EP5, . . . , EPn of the active period ACT is not limited thereto.

The pixels SP may sequentially receive the data voltage and the first, second, or third PAM data voltage for each row line during the address period ADDR. For example, the pixels SP from those located in the first row line to those located in the $n^{th}$ row line corresponding to the last row line may sequentially receive the data voltage and the first, second, or third PAM data voltage.

The pixels SP may sequentially emit light for each row line during each of the emission periods EP1, EP2, EP3, EP4, EP5, . . . , EPn. For example, the pixels SP from those located in the first row line to those located in the last row line may sequentially emit light.

Figure 7:
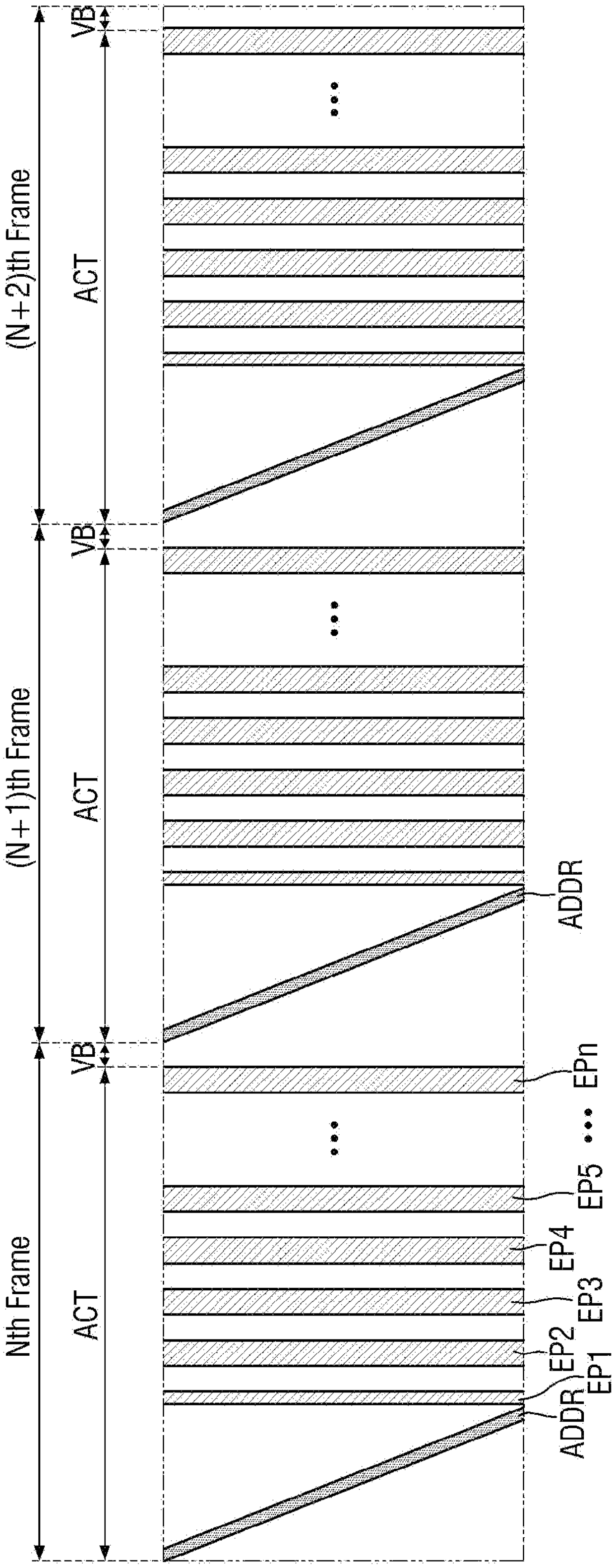
FIG. 7 is a diagram illustrating another example of operations of the $N^{th}$ to $(N+2)^{th}$ frame periods in a display device according to some embodiments.

FIG. 7 is a diagram illustrating another example of operations of the $N^{th}$ to $(N+2)^{th}$ frame periods in a display device according to some embodiments.

The embodiments described with respect to FIG. 7 may be the same as the embodiments described with respect to FIG. 6 except that the first to third pixels SP1, SP2, and SP3 simultaneously (or concurrently) emit light in each of the emission periods EP1, EP2, EP3, EP4, EP5, . . . , and EPn. Thus, some redundant description of the embodiments of FIG. 7 may be omitted.

Figure 8:
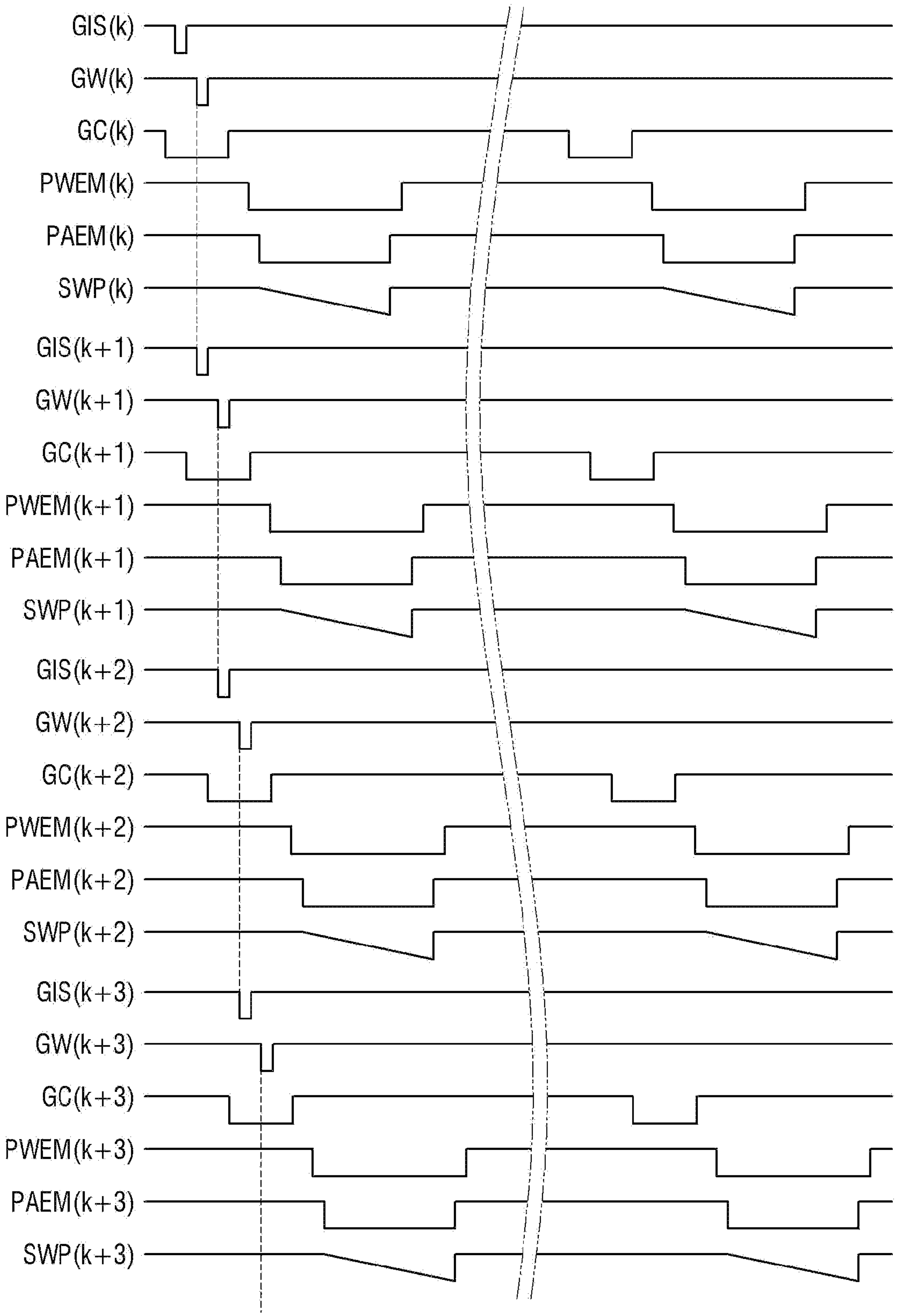
FIG. 8 is a waveform diagram illustrating signals applied to the pixels located on the $k^{th}$ to $(k+3)^{th}$ row lines in the display device of FIG. 5 according to some embodiments.

FIG. 8 is a waveform diagram illustrating signals applied to the pixels located in the $k^{th}$ to $(k+3)^{th}$ row lines in the display device of FIG. 5.

Referring to FIG. 8, each of the pixels SP located in the $k^{th}$ row line may be connected to a $k^{th}$ scan initialization line, a $k^{th}$ scan write line, a $k^{th}$ scan control line, a $k^{th}$ sweep line, a $k^{th}$ PWM emission line, and a $k^{th}$ PAM emission line.

The $k^{th}$ scan initialization line may supply a $k^{th}$ scan initialization signal GIS(k), and the $k^{th}$ scan write line may supply a $k^{th}$ scan write signal GW(k). The $k^{th}$ scan control line may supply a $k^{th}$ scan control signal GC(k), and the $k^{th}$ sweep line may supply a $k^{th}$ sweep signal SWP(k). The $k^{th}$ PWM emission line may supply a $k^{th}$ PWM emission signal PWEM(k), and the $k^{th}$ PAM emission line may supply a $k^{th}$ PAM emission signal PAEM(k).

Scan initialization signals GIS(k) to GIS(k+3), scan write signals GW(k) to GW(k+3), scan control signals GC(k) to GC(k+3), sweep signals SWP(k) to SWP(k+3), PWM emission signals PWEM(k) to PWEM(k+3), and PAM emission signals PAEM(k) to PAEM(k+3) may be sequentially shifted by one horizontal period 1H. The $k^{th}$ scan write signal GW(k) may be a signal shifted from the $k^{th}$ scan initialization signal GIS(k)) by one first horizontal period, and the $(k+1)^{th}$ scan initialization signal GW(k+1) may be a signal shifted from the $(k+1)^{th}$ scan initialization signal GIS(k+1) by one horizontal period. The $(k+1)^{th}$ scan initialization signal GIS(k+1) and the $k^{th}$ scan write signal GW(k) may be outputted at substantially the same time point.

Figure 9:
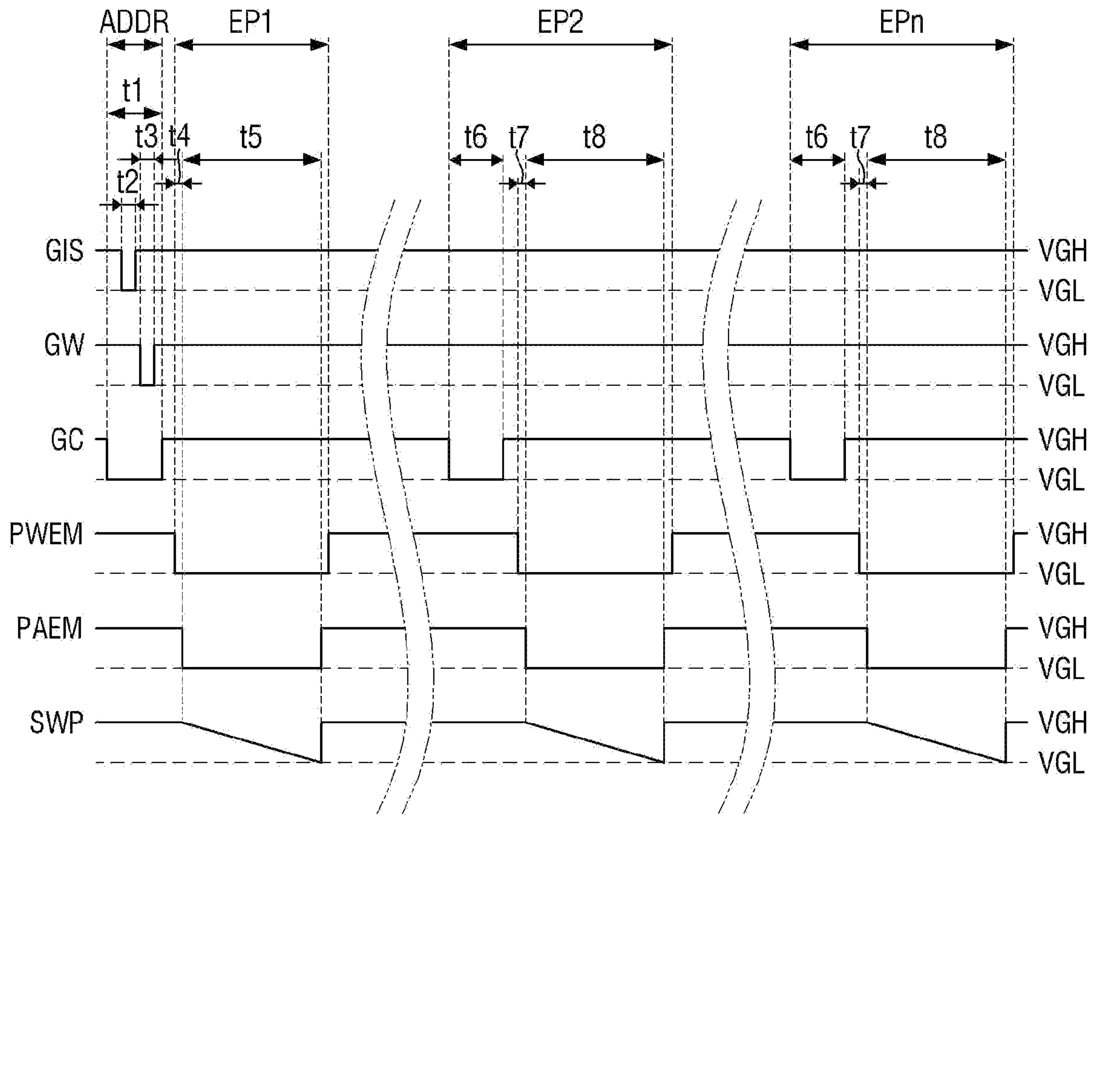
FIG. 9 is a waveform diagram illustrating signals applied to pixels during an address period and light emission periods of a frame period in the display device of FIG. 5 according to some embodiments.

FIG. 9 is a waveform diagram illustrating signals applied to pixels during an address period and light emission periods of a frame period in the display device of FIG. 5.

Referring to FIG. 9, the scan initialization signal GIS may control the turn-on of the third and tenth transistors T3 and T10 of each of the pixels SP. The scan write signal GW may control the turn-on of the second, fourth, ninth, and eleventh transistors T2, T4, T9, and T11. The scan control signal GC may control the turn-on of the seventh, thirteenth, sixteenth, and eighteenth transistors T7, T13, T16, and T18. The PWM emission signal PWEM may control the turn-on of the fifth, sixth, twelfth, and fourteenth transistors T5, T6, T12, and T14. The PAM emission signal PAEM may control the turn-on of the seventeenth transistor T17. The scan initialization signal GIS and the scan write signal GW may be generated at intervals of one frame period. The scan control signal GC, the PWM emission signal PWEM, and the PAM emission signal PAEM may be generated in a period of one emission period. Accordingly, the scan initialization signal GIS and the scan write signal GW may be generated once during the one frame period, and the scan control signal GC, the PWM emission signal PWEM, and the PAM emission signal PAEM may be generated as many as the number of the emission periods EP1 to EPn during the one frame period.

The address period ADDR may include first to third periods t1 to t3. The first period t1 may be a period in which the eighth node N8 and the ninth node N9 are initialized and the second capacitor electrode of the first capacitor C1 and the second capacitor electrode of the second capacitor C2 are maintained at a constant voltage. The second period t2 may be a period in which the first node N1 and the fourth node N4 are initialized. The third period t3 may be a period in which a data voltage Vdata and a threshold voltage Vth of the first transistor T1 are sampled at the first node N1 which is the gate electrode of the first transistor T1. The third period t3 may be a period in which a first PAM data voltage VPAM of the first PAM data line RDL and a threshold voltage Vth of the eighth transistor T8 are sampled at the fourth node N4 which is the gate electrode of the eighth transistor T8. The third period t3 may proceed after the second period t2. The start point of the first period t1 may be earlier than the start point of the second period t2, and the end point of the first period t1 may be later than the end point of the third period t3. Therefore, the first period t1 may include the second period t2 and the third period t3.

The first emission period EP1 may include a fourth period t4 and a fifth period t5. The fourth period t4 may be a period in which the control current Ic is applied to the eighth node N8, and the fifth period t5 may be a period in which the turn-on period of the fifteenth transistor T15 is controlled based on the control current Ic and the driving current Idr is supplied to the light emitting element ED.

Each of the second to $n^{th}$ emission periods EP2 to EPn may include sixth to eighth periods t6 to t8. The sixth period t6 may be a period in which the eighth node N8 and the ninth node N9 are initialized and the second capacitor electrode of the first capacitor C1 and the second capacitor electrode of the second capacitor C2 are maintained at a constant voltage. The seventh period t7 may be substantially the same period as the fourth period t4, and the eighth period t8 may be substantially the same period as the fifth period t5.

Among the first to $n^{th}$ emission periods EP1 to EPn, emission periods adjacent to each other may be spaced apart from each other by several to several tens of horizontal periods.

The scan control signal GC may have the gate-on voltage VGL during the first period t1 and the sixth period t6, and may have the gate-off voltage VGH during the other periods. The scan initialization signal GIS may have the gate-on voltage VGL during the second period t2, and may have the gate-off voltage VGH during the other periods. The scan write signal GW may have the gate-on voltage VGL during the third period t3, and may have the gate-off voltage VGH during the other periods. The gate-off voltage VGH may be the voltage having a level higher than that of the gate-on voltage VGL.

The PWM emission signal PWEM may have the gate-on voltage VGL during the fourth, fifth, seventh, and eighth periods t4, t5, t7, and t8, and may have the gate-off voltage VGH during the other periods. The PAM emission signal PAEM may have the gate-on voltage VGL during the fifth and eighth periods t5 and t8, and may have the gate-off voltage VGH during the other periods.

The sweep signal SWP may have a pulse in the form of a triangular wave during the fifth and eighth periods t5 and t8, and may have the gate-off voltage VGH during the other periods. For example, the sweep signal SWP may have the pulse in the form of the triangular wave that linearly decreases from the gate-off voltage VGH to the gate-on voltage VGL during the fifth period t5 and increases from the gate-on voltage VGL to the gate-off voltage VGH at the end point of the fifth period t5.

Figure 10:
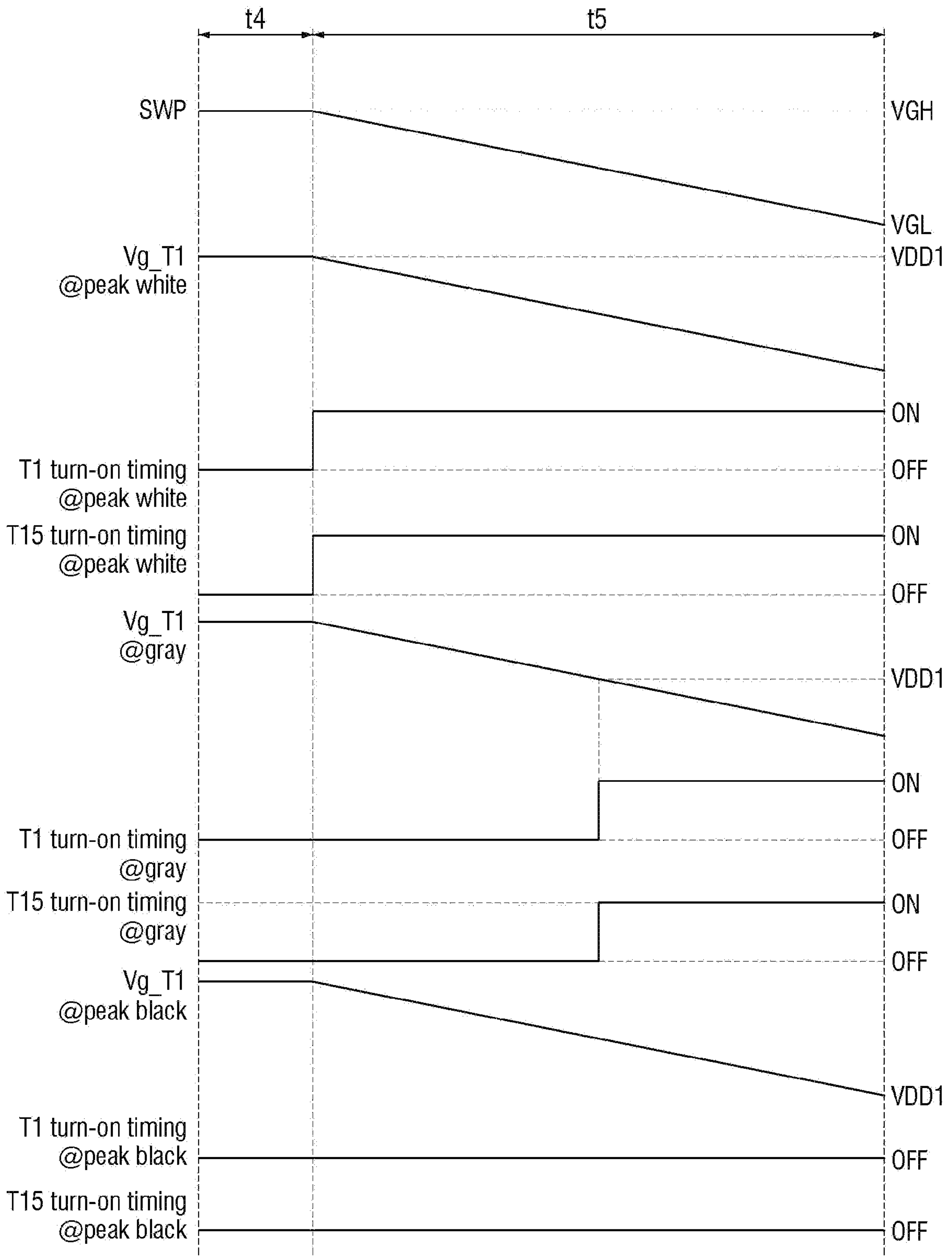
FIG. 10 is a timing diagram illustrating turn-on timings of the first and fifteenth transistors in the fourth period and the fifth period of FIG. 9 according to some embodiments.

FIG. 10 is a timing diagram illustrating turn-on timings of the first and fifteenth transistors in the fourth period and the fifth period of FIG. 9.

Referring to FIG. 10, when the data voltage Vdata is the data voltage of peak white grayscale, a voltage Vg_T1 of the gate electrode of the first transistor T1 may have the first power voltage VDD1 during the fourth period t4, and may decrease according to the sweep signal SWP during the fifth period t5. Because a source-gate voltage Vsg (=VDD1−Vg_T1) of the first transistor T1 is greater than the threshold voltage Vth thereof during the fifth period t5, the first transistor T1 may be kept turned on throughout the fifth period t5. The control current Ic of the first transistor T1 may be supplied to the eighth node N8 throughout the fifth period t5, and the fifteenth transistor T15 may be kept turned on throughout the fifth period t5. The driving current Idr may be applied to the light emitting element ED throughout the fifth period t5, and the light emitting element ED may emit light throughout the fifth period t5.

When the data voltage Vdata is the data voltage of gray level, the voltage Vg_T1 of the gate electrode of the first transistor T1 may have a voltage larger than the first power voltage VDD1 during the fourth period t4, and may decrease along the sweep signal SWP during the fifth period t5. The voltage Vg_T1 of the gate electrode of the first transistor T1 may decrease from a voltage larger than the first power voltage VDD1 to a voltage smaller than the first power voltage VDD1 during the fifth period t5. The first transistor T1 may be turned on for a part of the second half of the fifth period t5 according to the voltage decrease of the sweep signal SWP. The control current Ic of the first transistor T1 may flow to the eighth node N8 during a part of the second half of the fifth period t5, and the voltage of the eighth node N8 may have a gate-on level from the second half of the fifth period t5. Accordingly, the fifteenth transistor T15 may be kept turned on during a part of the second half of the fifth period t5. The driving current Idr may not be applied to the light emitting element ED during a part of the first half of the fifth period t5, or may be applied to the light emitting element ED during a part of the second half of the fifth period t5. Accordingly, the light emitting element ED may emit light during a part of the second half of the fifth period t5.

When the data voltage Vdata is the data voltage of peak black grayscale, the voltage Vg_T1 of the gate electrode of the first transistor T1 may have a voltage larger than the first power voltage VDD1 during the fourth period t4, and may decrease along the sweep signal SWP during the fifth period t5. The voltage Vg_T1 of the gate electrode of the first transistor T1 may decrease from a voltage larger than the first power voltage VDD1 to the first power voltage VDD1 during the fifth period t5. The source-gate voltage Vsg (=VDD1−Vg_T1) of the first transistor T1 may be less than the threshold voltage Vth thereof during the fourth and fifth periods t4 and t5, and the first transistor T1 may be kept turned off throughout the fourth and fifth periods t4 and t5. The control current Ic of the first transistor T1 may not be supplied to the eighth node N8 throughout the fourth and fifth periods t4 and t5, and the fifteenth transistor T15 may be kept turned off throughout the fourth and fifth periods t4 and t5. Accordingly, the driving current Idr may not be applied to the light emitting element ED throughout the fourth and fifth periods t4 and t5, and the light emitting element ED may not emit light throughout the fourth and fifth periods t4 and t5.

In FIG. 2, when the fifteenth transistor T15 includes a low-temperature polysilicon (LTPS)-based semiconductor layer, the fifteenth transistor T15 may be turned on during the fourth period t4 at peak black grayscale, and may be turned off during the fifth period t5. Because the transistor including the low-temperature polysilicon (LTPS)-based semiconductor layer has a relatively large S-factor, the time when the fifteenth transistor T15 is turned off in the fifth period t5 may be delayed, and the light emitting element ED may emit light for the delayed time, which may be disadvantageous in the expression of the peak black grayscale.

In FIG. 5, because the display device includes the fifteenth transistor T15 including an oxide-based semiconductor layer, the fifteenth transistor T15 may be kept turned off throughout the fourth and fifth periods t4 and t5 at the peak black grayscale. Because the fifteenth transistor T15 includes the oxide-based semiconductor layer, it may have excellent leakage current characteristics. Therefore, the display device may prevent the driving current Idr from being applied to the light emitting element ED throughout the fifth period t5, thus improving the expression of the peak black grayscale.

In this way, by adjusting the data voltage Vdata applied to the gate electrode of the first transistor T1, the emission period of the light emitting element ED may be adjusted. Accordingly, by maintaining constant the magnitude of the driving current Idr applied to the light emitting element ED and adjusting the pulse width of the voltage applied to the first electrode of the light emitting element ED, the grayscale or luminance displayed by the pixel SP may be adjusted.

For example, when the digital video data converted to the data voltage is 8 bits, the digital video data converted to the data voltage of the peak black grayscale may be 0, and the digital video data converted to the data voltage of the peak white grayscale may be 255. The data voltage of gray levels may be data other than 0 and 255.

Figure 11:
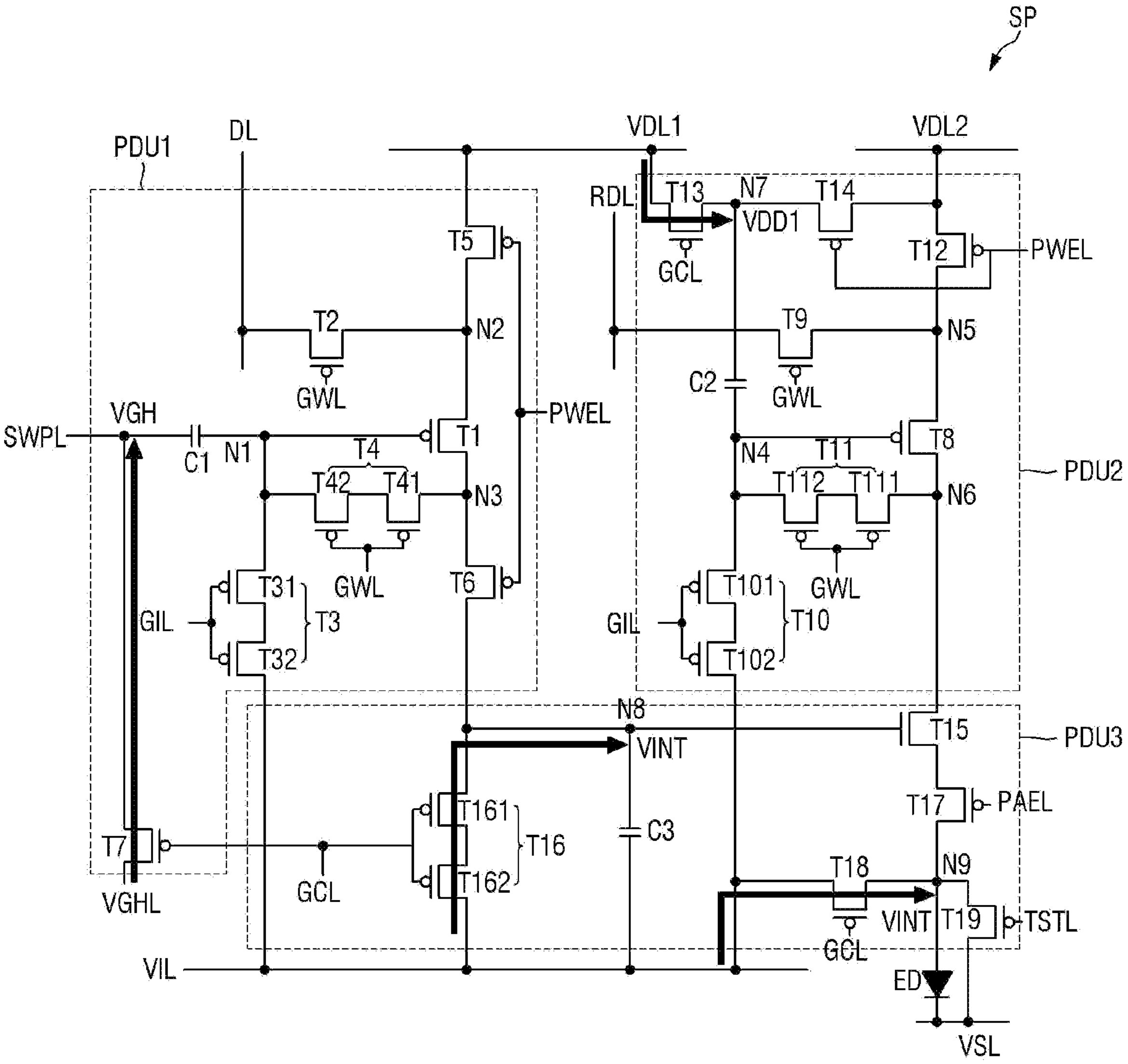
FIG. 11 is a circuit diagram illustrating the operation of the pixel during the first and sixth periods in the display device of FIG. 5 according to some embodiments.

FIG. 11 is a circuit diagram illustrating the operation of the pixel during the first and sixth periods in the display device of FIG. 5.

Referring to FIG. 11 in conjunction with FIGS. 5 and 9, the seventh, thirteenth, sixteenth, and eighteenth transistors T7, T13, T16, and T18 may be turned on based on the scan control signal GC during the first period t1 and the sixth period t6. The gate-off voltage VGH may be supplied to the second capacitor electrode of the first capacitor C1 through the seventh transistor T7. The first power voltage VDD1 may be supplied to the seventh node N7 serving as the second capacitor electrode of the second capacitor C2 through the thirteenth transistor T13. The initialization voltage VINT may be supplied to the eighth node N8 serving as the gate electrode of the fifteenth transistor T15 through the sixteenth transistor T16. The initialization voltage VINT may be supplied to the ninth node N9 serving as the first electrode of the light emitting element ED through the eighteenth transistor T18.

Figure 12:
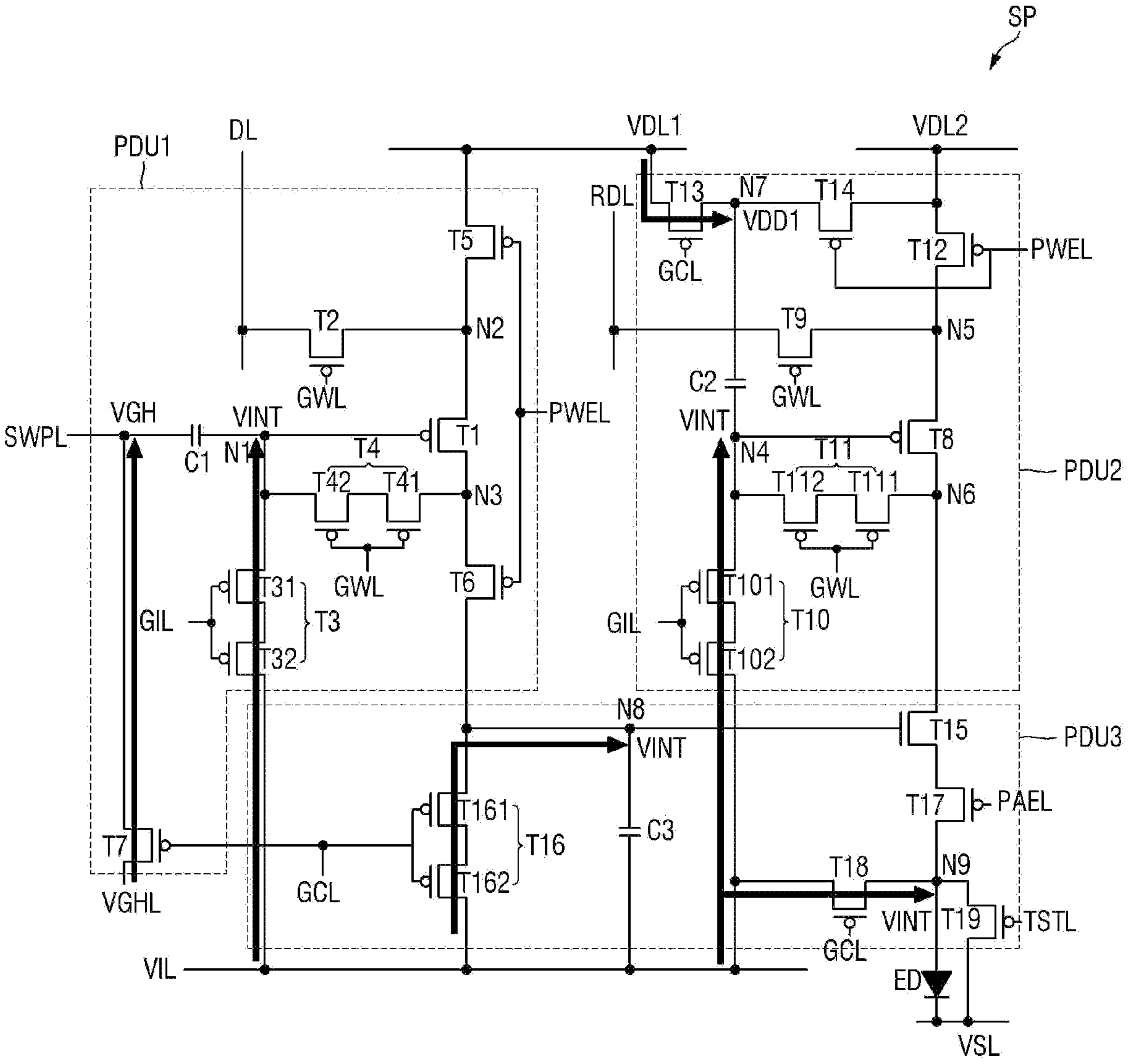
FIG. 12 is a circuit diagram illustrating the operation of the pixel during the second period in the display device of FIG. 5 according to some embodiments.

FIG. 12 is a circuit diagram illustrating the operation of the pixel during the second period in the display device of FIG. 5.

Referring to FIG. 12 in conjunction with FIGS. 5 and 9, the third and tenth transistors T3 and T10 may be turned on based on the scan initialization signal GIS during the second period t2. The initialization voltage VINT may be supplied to the first node N1 serving as the gate electrode of the first transistor T1 through the third transistor T3. The initialization voltage VINT may be supplied to the fourth node N4 serving as the gate electrode of the eighth transistor T8 through the tenth transistor T10.

Because the first period t1 includes the second period t2, the seventh, thirteenth, sixteenth, and eighteenth transistors T7, T13, T16, and T18 may be kept turned on during the second period t2.

Figure 13:
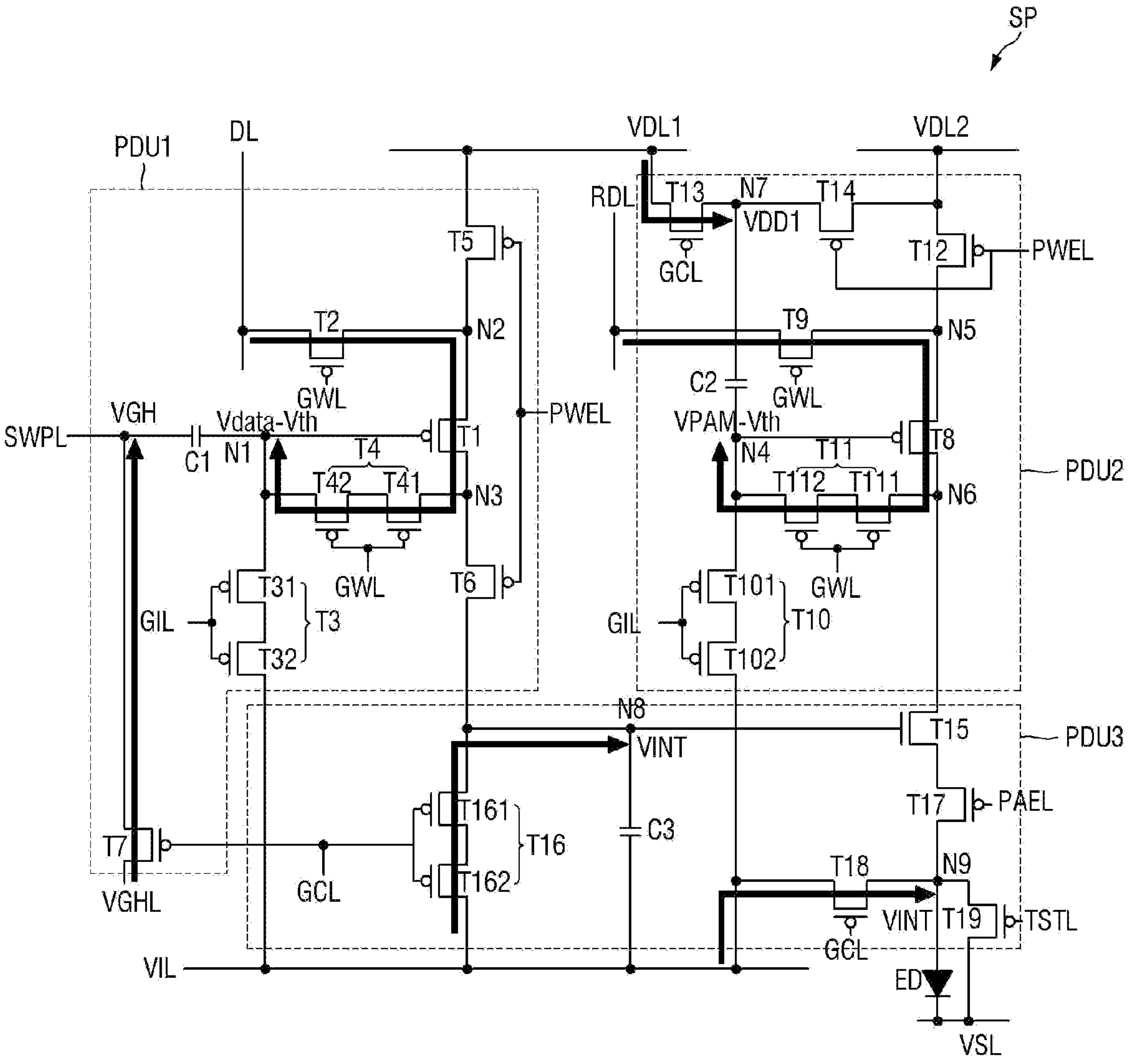
FIG. 13 is a circuit diagram illustrating the operation of the pixel during the third period in the display device of FIG. 5 according to some embodiments.

FIG. 13 is a circuit diagram illustrating the operation of the pixel during the third period in the display device of FIG. 5.

Referring to FIG. 13 in conjunction with FIGS. 5 and 9, the second, fourth, ninth, and eleventh transistors T2, T4, T9, and T11 may be turned on based on the scan write signal GW during the third period t3.

The data voltage Vdata may be supplied to the second node N2 serving as the first electrode of the first transistor T1 through the second transistor T2. In this case, the voltage (or the source-gate voltage Vsg (=Vdata−VINT)) between the first electrode and the gate electrode of the first transistor T1 may be greater than the threshold voltage Vth of the first transistor T1, and the first transistor T1 may be turned on. As the third transistor T3 is turned on, the second electrode and the gate electrode of the first transistor T1 may be electrically connected to each other, and the first transistor T1 may be driven as a diode. The first transistor T1 may be kept turned on until the source-gate voltage Vsg reaches the threshold voltage Vth. Accordingly, the voltage of the first node N1 serving as the gate electrode of the first transistor T1 may rise from "VINT" to "Vdata−Vth." For example, when the first transistor T1 is implemented as a P-type MOSFET, the threshold voltage Vth of the first transistor T1 may be less than 0V, but embodiments according to the present disclosure are not limited thereto.

The first PAM data voltage VPAM may be supplied to the fourth node N4 serving as the first electrode of the eighth transistor T8 through the ninth transistor T9. In this case, the voltage (or the source-gate voltage Vsg (=VPAM−VINT)) between the first electrode and the gate electrode of the eighth transistor T8 may be greater than the threshold voltage Vth of the eighth transistor T8, and the eighth transistor T8 may be turned on. As the eleventh transistor T11 is turned on, the second electrode and the gate electrode of the eighth transistor T8 may be electrically connected to each other, and the eighth transistor T8 may be driven as a diode. The eighth transistor T8 may be kept turned on until the source-gate voltage Vsg reaches the threshold voltage Vth. Accordingly, the voltage of the fourth node N4 which is the gate electrode of the eighth transistor T8 may rise from "VINT" to "VPAM−Vth." For example, when the eighth transistor T8 is implemented as a P-type MOSFET, the threshold voltage Vth of the eighth transistor T8 may be less than 0V, but embodiments according to the present disclosure are not limited thereto.

Because the first period t1 includes the third period t3, the seventh, thirteenth, sixteenth, and eighteenth transistors T7, T13, T16, and T18 may be kept turned on during the third period t3.

Figure 14:
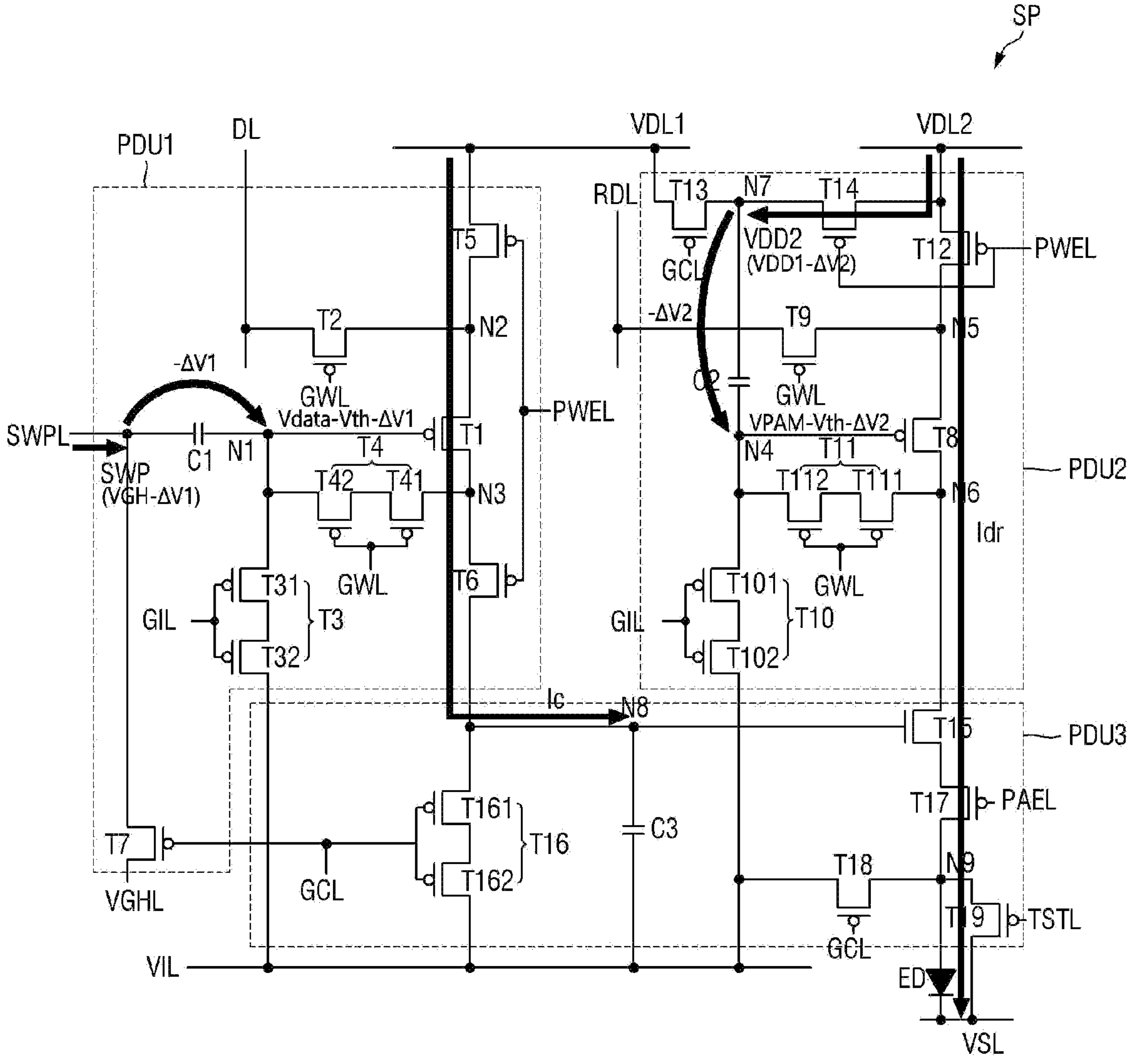
FIG. 14 is a circuit diagram illustrating the operation of the pixel during the fourth period, the fifth period, the seventh period, and the eighth period in the display device of FIG. 5 according to some embodiments.

FIG. 14 is a circuit diagram illustrating the operation of the pixel during the fourth period, the fifth period, the seventh period, and the eighth period in the display device of FIG. 5.

Referring to FIG. 14 in connection with FIGS. 5 and 9, the fifth, sixth, twelfth, and fourteenth transistors T5, T6, T12, and T14 may be turned on based on the PWM emission signal PWEM during the fourth, fifth, seventh, and eighth periods t4, t5, t7, and t8, and the seventeenth transistor T17 may be turned on based on the PAM emission signal PAEM during the fifth and eighth periods t5 and t8.

The first power voltage VDD1 may be supplied to the second node N2 serving as the first electrode of the first transistor T1 through the fifth transistor T5. As the sixth transistor T6 is turned on, the third node N3, which is the second electrode of the first transistor T1, may be electrically connected to the eighth node N8 of the third pixel driver PDU3. Before the fourth period t4 starts, the voltage Vdata−Vth of the first node N1 may be substantially equal to or higher than the first power voltage VDD1. Accordingly, until the fourth period t4 starts, the first transistor T1 may be kept turned off.

The control current Ic flowing through the first transistor T1 during the fourth period t4 may not depend on the threshold voltage Vth of the first transistor T1 as shown in Equation 1.

$$Ic=k''(Vsg-Vth)^2=k''(VDD1-V\text{data}+Vth-Vth)^2=k''(VDD1-V\text{data})^2 \quad \text{Equation 1}$$

In Equation 1, k" refers to the proportional coefficient determined by the structure and physical characteristics of the first transistor T1, Vth refers to the threshold voltage of the first transistor T1, VDD1 refers to the first power voltage, and Vdata refers to the data voltage.

The period in which the control current Ic is applied to the eighth node N8 may vary depending on the magnitude of the data voltage Vdata applied to the first transistor T1. The voltage of the eighth node N8 may vary according to the magnitude of the data voltage Vdata, and the voltage of the eighth node N8 may control the turn-on period of the fifteenth transistor T15. Therefore, the display device may control the substantial emission period in which the driving current Idr is applied to the light emitting element ED during the fifth period t5 by controlling the turn-on period of the fifteenth transistor T15.

The sweep signal SWP may linearly decrease from the gate-off voltage VGH to the gate-on voltage VGL during the fifth period t5. The voltage variation ΔV1 of the sweep signal SWP may be reflected to the first node N1 by the first capacitor C1, and the voltage of the first node N1 may be "Vdata−Vth−VV1." Accordingly, the voltage of the first node N1 may decrease linearly according to the decrease in the voltage of the sweep signal SWP during the fifth period t5.

The second power voltage VDD2 may be supplied to the seventh node N7 which is the second capacitor electrode of the second capacitor C2. The voltage of the seventh node N7 may be changed from the first power voltage VDD1 to the second power voltage VDD2. The voltage variation ΔV2 of the seventh node N7 may be reflected to the fourth node N4 serving as the gate electrode of the eighth transistor T8 by the second capacitor C2.

The driving current Idr, which flows according to the voltage VPAM−Vth of the fourth node N4 serving as the gate electrode of the eighth transistor T8 may be supplied to the fifteenth transistor T15. The fifteenth transistor T15 may be turned on during the fifth period t5 to supply the driving current Idr to the light emitting element ED. The driving current Idr may not depend on the threshold voltage Vth of the eighth transistor T8 as shown in Equation 2.

$$Idr=k'(Vsg-Vth)^2=k'(VDD2-V\text{PAM}+Vth)^2=k'(VDD2-V\text{PAM})^2 \quad \text{Equation 2}$$

In Equation 2, k' refers to the proportional coefficient determined by the structure and physical characteristics of the eighth transistor T8, Vth refers to the threshold voltage of the eighth transistor T8, VDD2 refers to the second power voltage, and VPAM refers to the first PAM data voltage.

In addition, the seventh and eighth periods t7 and t8 of each of the second to $n^{th}$ emission periods EP2 to EPn may be substantially the same as the above-described fourth and fifth periods t4 and t5, respectively. In each of the second to $n^{th}$ emission periods EP2 to EPn, after the eighth node N8 and the ninth node N9 are initialized, the period in which the driving current Idr generated in response to the first PAM data voltage VPAM written in the gate electrode of the eighth transistor T8 is applied to the light emitting element ED may be adjusted based on the data voltage Vdata written in the gate electrode of the first transistor T1 during the address period ADDR.

Because the test signal of the test signal line TSTL is applied at the gate-off voltage VGH during the active period ACT of the $N^{th}$ frame period, the nineteenth transistor T19 may be turned-off during the active period ACT of the $N^{th}$ frame period.

Because the second and third pixels SP2 and SP3 may be operated in substantially the same manner as the first pixel SP1, descriptions of the operations of the second and third pixels SP2 and SP3 will be omitted.

Figure 15:
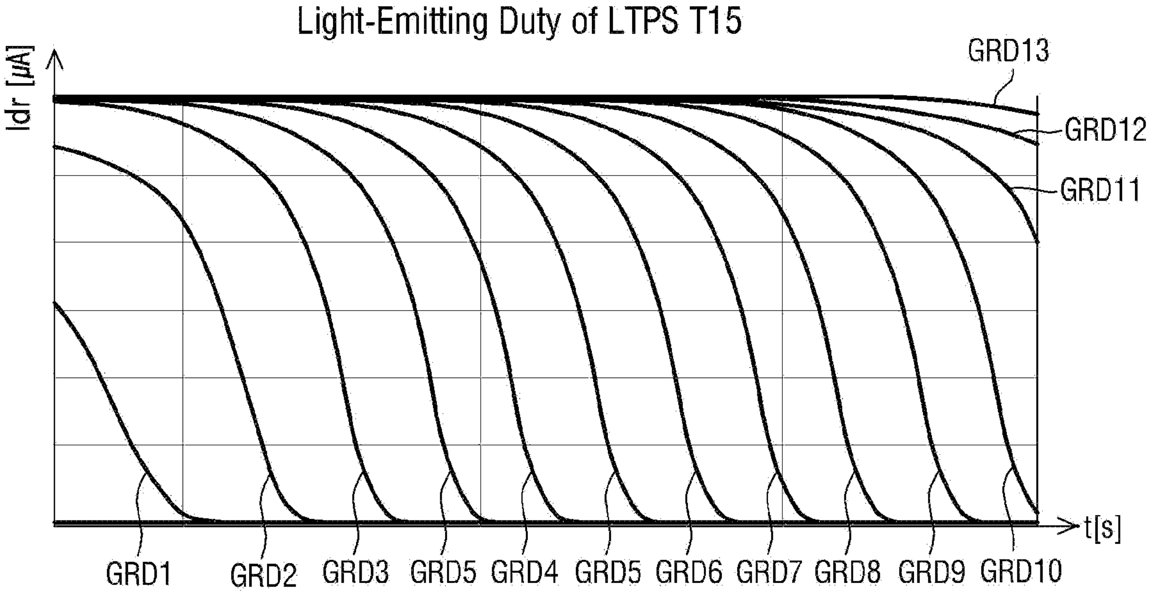
FIG. 15 presents a graph showing the light emitting duty and the transfer curve of the fifteenth transistor in the display device of FIG. 2 according to some embodiments.
Figure 15:
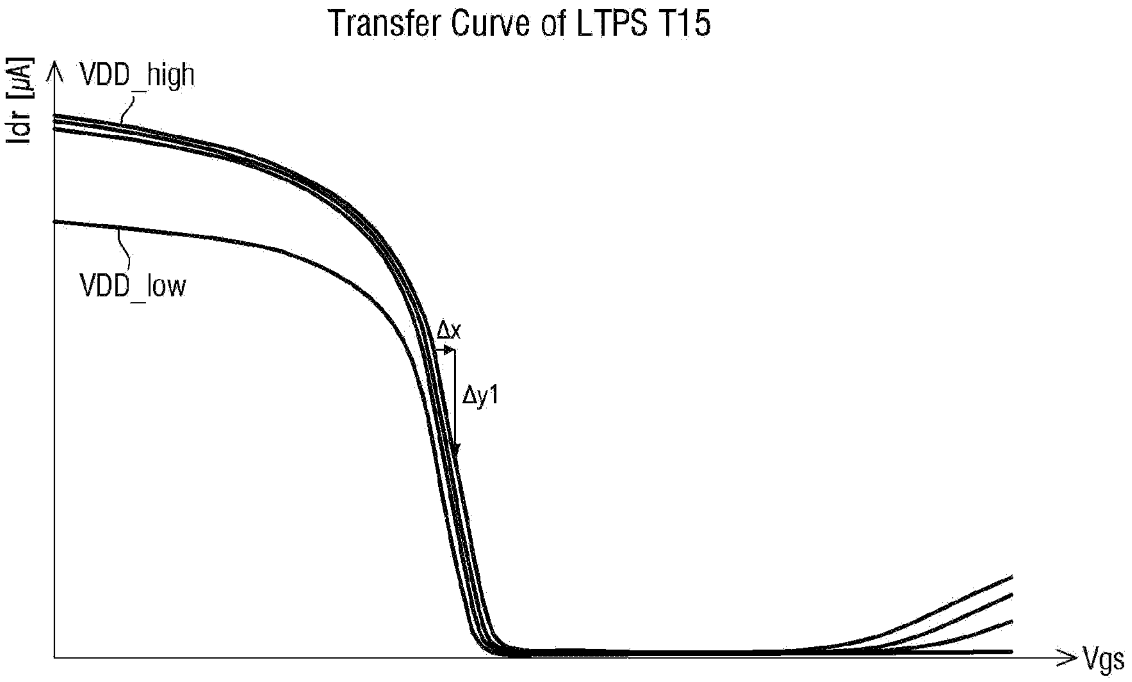

FIG. 15 presents a graph showing the light emitting duty and the transfer curve of the fifteenth transistor in the display device of FIG. 2.

Referring to FIG. 15, the fifteenth transistor T15 may include a low-temperature polysilicon (LTPS)-based semiconductor layer. The fifteenth transistor T15 may control the period in which the driving current Idr is supplied to the light emitting element ED based on the voltage of the eighth node N8. The turn-on period of the fifteenth transistor T15 may be controlled according to first to thirteenth grayscales GRD1 to GRD13. Here, the first gray level GRD1 may be closest to black among the first to thirteenth gray levels GRD1 to GRD13, and the thirteenth grayscale GRD13 may be closest to white among the first to thirteenth gray levels GRD1 to GRD13. The fifteenth transistor T15 may have the shortest turn-on period at the first gray level GRD1 and the longest turn-on period at the thirteenth gray level GRD13. As the turn-on period of the fifteenth transistor T15 increases, the amount of light emission of the light emitting element ED may increase.

The transfer curve with respect to a high power voltage (VDD_high) and the transfer curve with respect to a low power voltage (VDD_low) may have preset slopes (−Δy1/Δx). An S-factor may be inversely proportional to the absolute value of the slope (−Δy1/Δx) of the transfer curve. As the fifteenth transistor T15 includes the low-temperature polysilicon (LTPS)-based semiconductor layer, it may have a relatively large S-factor. Accordingly, the time when the fifteenth transistor T15 is turned off in the fifth period t5 may be delayed, so that the constant current driving region may be reduced, which may be disadvantageous in the expression of low gray levels.

Figure 16:
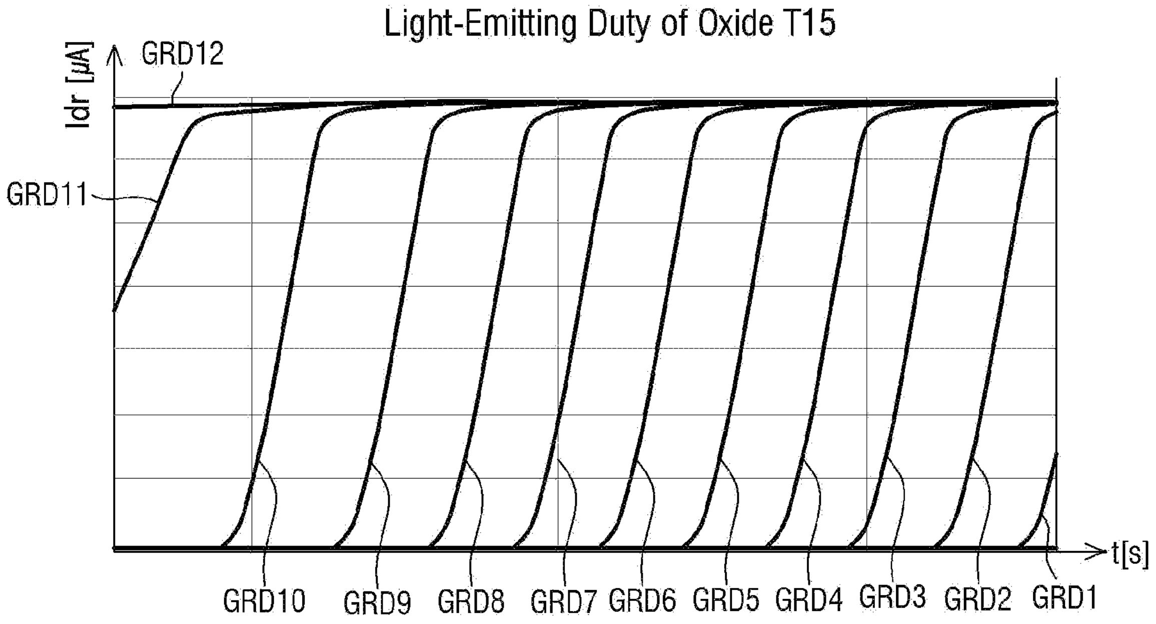
FIG. 16 presents a graph showing the light emitting duty and the transfer curve of the fifteenth transistor in the display device of FIG. 5 according to some embodiments.
Figure 16:
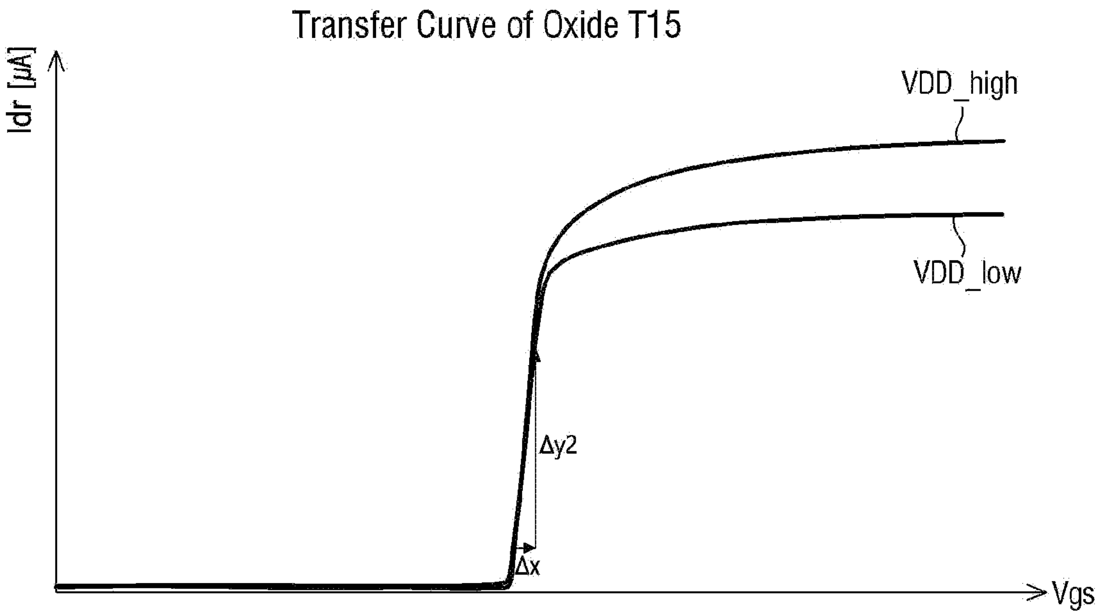

FIG. 16 presents a graph showing the light emitting duty and the transfer curve of the fifteenth transistor in the display device of FIG. 5.

Referring to FIG. 16, the fifteenth transistor T15 may include an oxide-based semiconductor layer. The fifteenth transistor T15 may control the period in which the driving current Idr is supplied to the light emitting element ED based on the voltage of the eighth node N8. The turn-on period of the fifteenth transistor T15 may be controlled according to the first to twelfth grayscales GRD1 to GRD12. Here, the first gray level GRD1 may be closest to black among the first to twelfth gray levels GRD1 to GRD12, and the twelfth gray level GRD12 may be closest to white among the first to twelfth gray levels GRD1 to GRD12. The fifteenth transistor T15 may have the shortest turn-on period at the first gray level GRD1 and the longest turn-on period at the twelfth gray level GRD12. As the turn-on period of the fifteenth transistor T15 increases, the amount of light emission of the light emitting element ED may increase.

The transfer curve with respect to the high power voltage (VDD_high) and the transfer curve with respect to the low power voltage (VDD_low) may have predetermined slopes (Δy2/Δx). The S-factor may be inversely proportional to the absolute value of the slope (Δy2/Δx) of the transfer curve. As the fifteenth transistor T15 includes the oxide-based semiconductor layer, it may have a relatively small S-factor. Accordingly, the fifteenth transistor T15 may increase the constant current driving region in the low grayscale region and improve expression of low gray levels. As the fifteenth transistor T15 may maintain the turn-off state and has excellent leakage current characteristics at the peak black grayscale, it may improve the expression of the peak black grayscale. The fifteenth transistor T15 may prevent a leakage current from being supplied to the light emitting element ED and stably maintain the voltage inside the pixel circuit.

Figure 17:
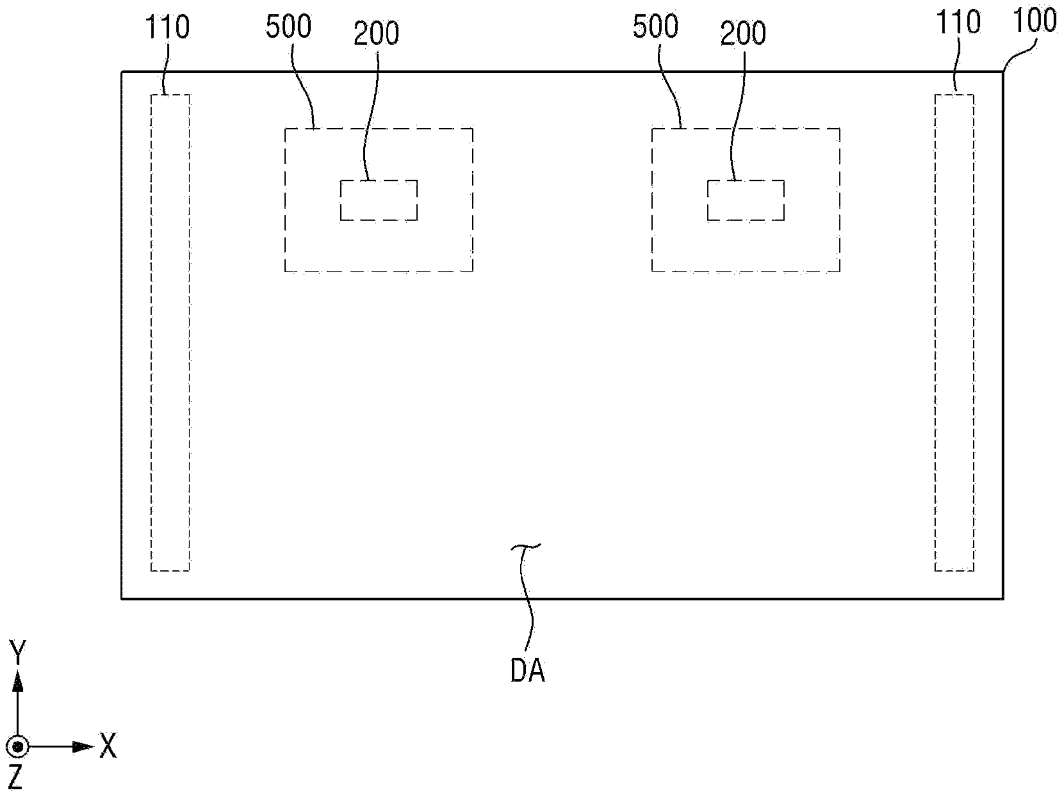
FIG. 17 is a plan view illustrating a display device according to some embodiments.

FIG. 17 is a plan view illustrating a display device according to some embodiments.

Referring to FIG. 17, a display device is a device for displaying a moving image or a still image. The display device 1 may be used as a display screen of various devices, such as a television, a laptop computer, a monitor, a billboard and an Internet-of-Things (IOT) device, as well as portable electronic devices such as a mobile phone, a smartphone, a tablet personal computer (PC), a smart watch, a watch phone, a mobile communication terminal, an electronic notebook, an electronic book, a portable multimedia player (PMP), a navigation device and an ultra-mobile PC (UMPC).

The display device may include the display panel 100, data drivers 200, and circuit boards 500.

The display panel 100 may be formed in a rectangular shape, in plan view, having long sides in a first direction (X-axis direction) and short sides in a second direction (Y-axis direction) crossing the first direction (X-axis direction). The corner where the long side in the first direction (X-axis direction) and the short side in the second direction (Y-axis direction) meet may be rounded to have a predetermined curvature or may be right-angled. The planar shape of the display panel 100 is not limited to the rectangular shape, and may be formed in another polygonal shape, a circular shape or an elliptical shape. The display panel 100 may be formed to be flat, but embodiments according to the present disclosure are not limited thereto. For example, the display panel 100 may include a curved portion formed at left and right ends and having a predetermined curvature or a varying curvature. The display panel 100 may be formed flexibly such that it can be curved, bent, folded, or rolled.

The display panel 100 may include the display area DA for displaying an image. The display area DA may include the first to third pixels SP1, SP2, and SP3 that emit light, thus displaying the image. The light emitting element ED of each of the first to third pixels SP1, SP2, and SP3 may be a micro light emitting diode including an inorganic semiconductor, but embodiments according to the present disclosure are not limited thereto.

The gate drivers 110 may be located at both edges of the display area DA. For example, the gate drivers 110 may be located at left and right edges of the display area DA, but embodiments according to the present disclosure are not limited thereto. As another example, the gate driver 110 may be located at one edge of the display area DA.

The data driver 200 may generate a data voltage and supply the generated data voltage to the display panel 100 through the circuit board 500. Each of the data drivers 200 may be formed of an integrated circuit (IC) and mounted on the circuit board 500. As another example, the data driver 200 may be attached to the rear surface of the display panel 100 by a chip on glass (COG) method, a chip on plastic (COP) method, or an ultrasonic bonding method.

The circuit board 500 may mount thereon the data driver 200 and may be located on the rear surface of the display panel 100. The circuit board 500 may be attached to a pad portion located on the rear surface of the display panel 100 using a conductive adhesive member such as an anisotropic conductive film. The circuit board 500 may be electrically connected to lines of the display panel 100 through the pad portion. The circuit board 500 may be a flexible printed circuit board, a printed circuit board, or a flexible film such as a chip on film.

Figure 18:
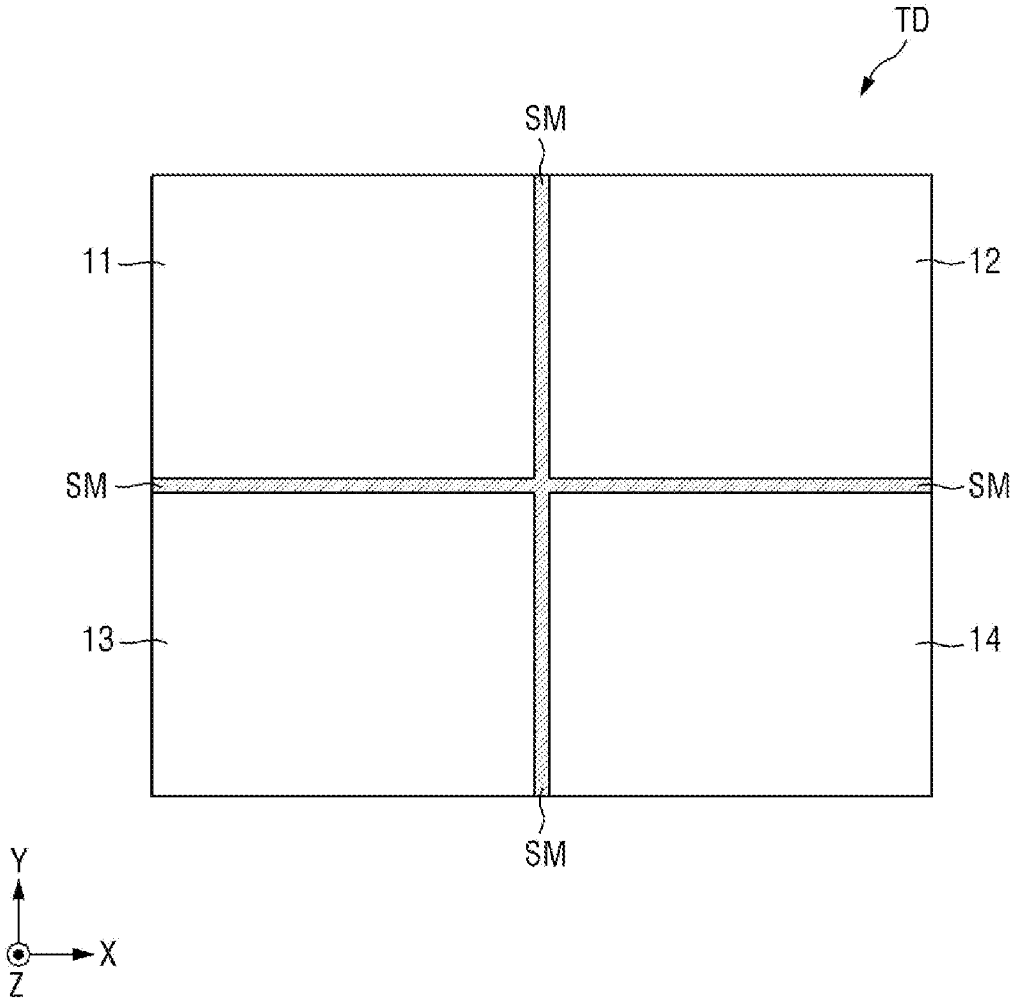
FIG. 18 is a plan view illustrating a tiled display device including the display device of FIG. 17 according to some embodiments.

FIG. 18 is a plan view illustrating a tiled display device including the display device of FIG. 17.

Referring to FIG. 18, a tiled display device TD may include a plurality of display devices 11, 12, 13, and 14. For example, the tiled display device TD may include the first display device 11, the second display device 12, the third display device 13, and the fourth display device 14.

The first to fourth display devices 11, 12, 13, and 14 may be arranged in a grid shape. For example, the first display device 11 and the second display device 12 may be arranged in the first direction (X-axis direction). The first display device 11 and the third display device 13 may be arranged in the second direction (Y-axis direction). The third display device 13 and the fourth display device 14 may be arranged in the first direction (X-axis direction). The second display device 12 and the fourth display device 14 may be arranged in the second direction (Y-axis direction).

The number and the layout of the plurality of display devices 11, 12, 13, and 14 of the tiled display device TD are not limited to the example shown in FIG. 18. The number and the layout of the display devices 11, 12, 13, and 14 may be selected in consideration of the size of each of the display devices 11 to 14 and the size and the shape of the tiled display device TD.

Each of the first to fourth display devices 11, 12, 13, and 14 may have a rectangular shape including long sides and short sides. The first to fourth display devices 11, 12, 13, and 14 may be arranged such that the long sides or the short sides thereof are connected to each other. At least some of the first to fourth display devices 11, 12, 13, and 14 may be arranged at an edge of the tiled display device TD, and may form one side of the tiled display device TD. At least one of the first to fourth display devices 11, 12, 13, or 14 may be located at at least one corner of the tiled display device TD, and may form two adjacent sides of the tiled display device TD. At least one of the first to fourth display devices 11, 12, 13, or 14 may be surrounded by other display devices.

The tiled display device TD may include a coupling area SM located between the first to fourth display devices 11, 12, 13, and 14. For example, the coupling area SM may be located between the first display device 11 and the second display device 12, between the first display device 11 and the third display device 13, between the second display device 12 and the fourth display device 14, and between the third display device 13 and the fourth display device 14.

The coupling area SM may include a coupling member or an adhesive member. In this case, the first to fourth display devices 11, 12, 13, and 14 may be connected to each other by the coupling member or the adhesive member of the coupling area SM.

As shown in FIG. 17, when the gate driver 110 is located in the display area DA and the circuit board 500 is located on the rear surface of the display panel 100, each of the first to fourth display devices 11, 12, 13, and 14 may not include a non-display area NDA in which the first to third pixels SP1, SP2, and SP3 are not located. Therefore, it may be possible to minimize or prevent the coupling area SM from being seen. Accordingly, because the tiled display device TD may prevent or reduce instances of images of the first to fourth display devices 11, 12, 13, and 14 being cut off, the sense of immersion of the tiled display device TD may be relatively improved.

What is claimed is:

1. A display device comprising:
a first transistor configured to control a control current based on a voltage of a first node;
a second transistor configured to electrically connect a second node that is a first electrode of the first transistor to a first data line in response to a scan write signal;
a third transistor configured to control a driving current based on a voltage of a third node;
a fourth transistor configured to electrically connect a fourth node that is a first electrode of the third transistor to a second data line in response to the scan write signal;
a fifth transistor configured to control the driving current based on a voltage of a fifth node having received the control current; and
a light emitting element configured to receive the driving current and to emit light,
wherein the fifth transistor is a MOSFET of a different type from that of the first to fourth transistors.

2. The display device of claim 1, wherein the fifth transistor comprises an oxide-based semiconductor layer, and the first to fourth transistors comprise a low-temperature polysilicon-based semiconductor layer.

3. The display device of claim 1, wherein an S-factor of the fifth transistor is smaller than an S-factor of the first to fourth transistors.

4. The display device of claim 1, further comprising:
a sweep line configured to supply a sweep signal having a pulse that linearly decreases from a gate-off voltage to a gate-on voltage; and
a first capacitor comprising a first capacitor electrode connected to the first node, and a second capacitor electrode connected to the sweep line.

5. The display device of claim 4, further comprising:
a sixth transistor configured to electrically connect the first node to an initialization voltage line in response to a scan initialization signal; and
a seventh transistor configured to electrically connect a sixth node that is a second electrode of the first transistor to the first node in response to the scan write signal.

6. The display device of claim 5, further comprising:
an eighth transistor configured to electrically connect a first power line to the second node in response to a PWM emission signal received from a PWM emission line; and
a ninth transistor configured to electrically connect the sixth node to the fifth node in response to the PWM emission signal.

7. The display device of claim 6, further comprising a tenth transistor configured to electrically connect a gate-off voltage line to a second capacitor electrode of the first capacitor in response to a scan control signal.

8. The display device of claim 1, further comprising:
a second capacitor comprising a first capacitor electrode connected to the third node and a second capacitor electrode connected to a seventh node;
an eleventh transistor configured to electrically connect a first power line to the seventh node in response to a scan control signal; and
a twelfth transistor configured to electrically connect a second power line to the seventh node in response to a PWM emission signal.

9. The display device of claim 8, further comprising:
a thirteenth transistor configured to electrically connect the third node to an initialization voltage line in response to a scan initialization signal; and
a fourteenth transistor configured to electrically connect an eighth node that is a second electrode of the third transistor to the third node in response to the scan write signal.

10. The display device of claim 9, further comprising:
a fifteenth transistor configured to electrically connect a second power line to the fourth node in response to the PWM emission signal; and
a sixteenth transistor configured to electrically connect a second electrode of the fifth transistor to a first electrode of the light emitting element in response to a PAM emission signal.

11. The display device of claim 1, further comprising:
a third capacitor comprising a first capacitor electrode connected to the fifth node and a second capacitor electrode connected to an initialization voltage line; and
a seventeenth transistor configured to electrically connect the fifth node to the initialization voltage line in response to a scan initialization signal.

12. The display device of claim 11, further comprising an eighteenth transistor configured to electrically connect a first electrode of the light emitting element to the initialization voltage line in response to a scan control signal.

13. A display device comprising:
a first transistor configured to control a control current based on a voltage of a first node;
a second transistor configured to electrically connect a second node that is a first electrode of the first transistor to a first data line in response to a scan write signal;
a third transistor configured to control a driving current based on a voltage of a third node;
a fourth transistor configured to electrically connect a fourth node that is a first electrode of the third transistor to a second data line in response to the scan write signal;
a fifth transistor configured to control the driving current based on a voltage of a fifth node having received the control current; and
a light emitting element configured to receive the driving current and to emit light,
wherein the fifth transistor is configured to be turned on in response to a gate-source voltage being greater than a threshold voltage, and the first to fourth transistors are configured to be turned on in response to a source-gate voltage being greater than the threshold voltage.

14. The display device of claim 13, wherein the fifth transistor comprises an oxide-based semiconductor layer, and the first to fourth transistors comprise a low-temperature polysilicon-based semiconductor layer.

15. The display device of claim 13, further comprising:
a sweep line configured to supply a sweep signal having a pulse that linearly decreases from a gate-off voltage to a gate-on voltage; and
a first capacitor comprising a first capacitor electrode connected to a gate electrode of the first transistor, and a second capacitor electrode connected to the sweep line.

16. The display device of claim 15, further comprising:

a sixth transistor configured to electrically connect the first node to an initialization voltage line in response to a scan initialization signal;

a seventh transistor configured to electrically connect a sixth node that is a second electrode of the first transistor to the first node in response to the scan write signal; and an eighth transistor configured to electrically connect a gate-off voltage line to the second capacitor electrode of the first capacitor in response to a scan control signal.

17. The display device of claim 16, wherein the scan initialization signal and the scan write signal are generated at intervals of one frame period, and the scan control signal is generated as many as a number of emission periods during the one frame period.

18. A display device comprising:

a first transistor configured to control a control current based on a voltage of a first node;

a first capacitor comprising a first capacitor electrode connected to the first node, and a second capacitor electrode connected to a sweep line;

a second transistor configured to control a driving current based on a voltage of a second node;

a second capacitor comprising a first capacitor electrode connected to the second node and a second capacitor electrode connected to a third node;

a third transistor configured to control the driving current based on a voltage of a fourth node having received the control current;

a third capacitor comprising a first capacitor electrode connected to the fourth node and a second capacitor electrode connected to an initialization voltage line; and a light emitting element configured to receive the driving current and to emit light, wherein the third transistor is a MOSFET of a different type from that of the first and second transistors.

19. The display device of claim 18, further comprising:

a fourth transistor configured to electrically connect a fifth node that is a first electrode of the first transistor to a first data line; and a fifth transistor configured to electrically connect a sixth node that is a first electrode of the second transistor to a second data line.

20. The display device of claim 19, further comprising:

a sixth transistor configured to electrically connect the first node to the initialization voltage line in response to a scan initialization signal; and a seventh transistor configured to electrically connect a seventh node that is a second electrode of the first transistor to the first node in response to the scan write signal.

* * * * *